(12) United States Patent
Hindi et al.

(10) Patent No.: US 11,548,192 B1
(45) Date of Patent: Jan. 10, 2023

(54) SYSTEM, APPARATUS, AND METHODS FOR MANUFACTURING BIODEGRADABLE BIOPOLYMERIC MATERIALS

(71) Applicant: King Abdulaziz University, Jeddah (SA)

(72) Inventors: Sherif Shawki Zaki Hindi, Jeddah (SA); Mona Othman I. Albureikan, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/724,117

(22) Filed: Apr. 19, 2022

(51) Int. Cl.
| | |
|---|---|
| B29C 41/38 | (2006.01) |
| B29C 41/00 | (2006.01) |
| B29C 41/02 | (2006.01) |
| B29C 41/50 | (2006.01) |
| B29L 7/00 | (2006.01) |
| B29K 29/00 | (2006.01) |

(52) U.S. Cl.
CPC ............ *B29C 41/38* (2013.01); *B29C 41/003* (2013.01); *B29C 41/02* (2013.01); *B29C 41/50* (2013.01); *B29K 2029/04* (2013.01); *B29K 2089/00* (2013.01); *B29L 2007/002* (2013.01)

(58) Field of Classification Search
CPC ....... B29C 41/38; B29C 41/003; B29C 41/02; B29C 41/50; B29K 2089/00
See application file for complete search history.

(56) References Cited

U.S. PATENT DOCUMENTS

| 435,566 | A | * | 9/1890 | Meyer | ....................... F25C 1/12 |
| | | | | | 62/74 |
| 3,616,495 | A | * | 11/1971 | Lemelson | ............... B21C 35/02 |
| | | | | | 425/162 |
| 10,016,784 | B2 | | 7/2018 | Binner et al. | |
| 10,526,479 | B2 | | 1/2020 | Friedrich et al. | |
| 2005/0281701 | A1 | * | 12/2005 | Lynch | ....................... B22F 3/22 |
| | | | | | 419/10 |
| 2008/0221246 | A1 | | 9/2008 | Imam et al. | |

FOREIGN PATENT DOCUMENTS

| CN | 111375748 B | * | 11/2021 | ............. B22D 1/007 |
| WO | 2017214187 A1 | | 12/2017 | |

OTHER PUBLICATIONS

Yi et al., CN 111375748 B, Machine Translation, Nov. 5, 2021 (Year: 2021).*

* cited by examiner

*Primary Examiner* — Galen H Hauth
(74) *Attorney, Agent, or Firm* — WCF IP

(57) ABSTRACT

An apparatus, and a system for manufacturing a bioplastic material from a blend solution of gum arabica (GA) and polyvinyl alcohol (PVA) is provided. The apparatus includes a panel having a first end, a second end distal to the first end, and a plurality of walls extending from a periphery of the panel, the panel configured to accommodate the blend solution. The apparatus further includes a plurality of support members coupled to the first end and the second end of the panel and configured to adjust a slope angle of the panel; and one or more vibration generating units coupled to the plurality of support members and configured to vibrate the panel when the blend solution flows from the first end to the second end of the panel. A method of preparing the bioplastic material is also disclosed.

3 Claims, 21 Drawing Sheets

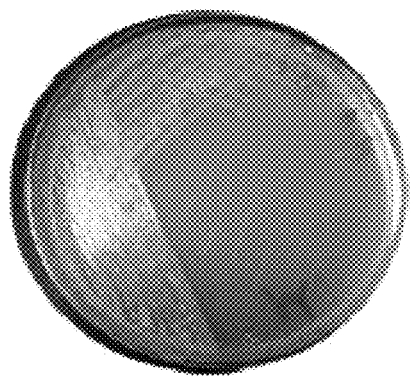
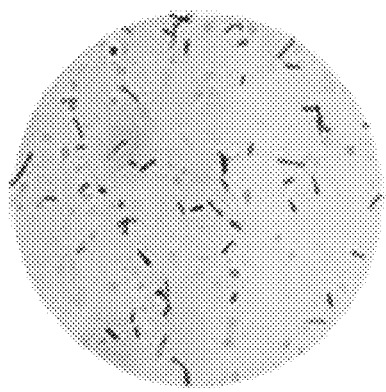
FIG. 15A  FIG. 15B
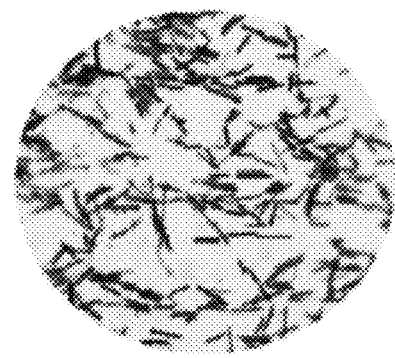
FIG. 16A  FIG. 16B
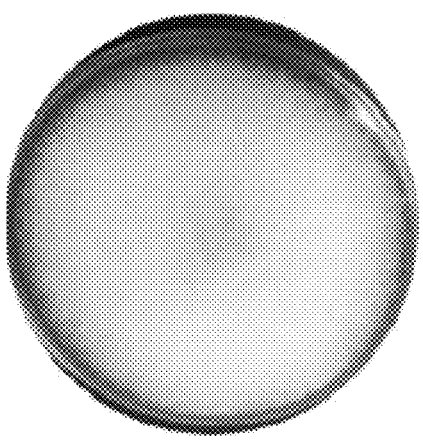
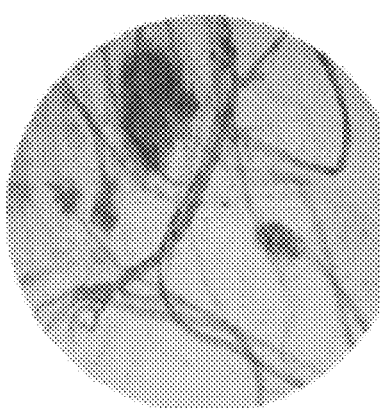
FIG. 17A  FIG. 17B

SYSTEM, APPARATUS, AND METHODS FOR MANUFACTURING BIODEGRADABLE BIOPOLYMERIC MATERIALS

TECHNICAL FIELD

The present disclosure relates to the field of bioplastic materials, and more specifically, the present disclosure relates to a system, apparatus, and a method for manufacturing a bioplastic material from a blend solution of a gum arabica (GA) and a polyvinyl alcohol (PVA).

BACKGROUND

Biodegradable polymers are a special class of polymers that break down, after its intended purpose, by bacterial decomposition process, to result in natural byproducts such as gases ($CO_2$, $N_2$), water, biomass, and inorganic salts. There are several kinds of biodegradable polymers that are used in different industrial applications such as a poly-lactic acid/poly-lactide, a poly-3-hydroxy-butyrate, a thermoplastic starch, a gelatin and a GA.

Among other biodegradable polymers, GA has been widely used in many applications since ancient Egyptians time due to its water soluble and polysaccharide nature. PVA is a synthetic polymer that has been used during the first half of the 20th century worldwide. It exhibits good film forming ability with good mechanical properties, good chemical resistance, and adhesive property. In the recent years a blend of GA and PVA have been used for manufacture of bioplastic materials. However, the drawbacks associated with this process for manufacture of the bioplastic material is the drying process for the casted GA membrane due to its high parent-content of water, thereby making the entire process time and cost intensive. Hence, there exists a need to develop an apparatus/method which overcomes the above limitations.

SUMMARY

The present disclosure relates to an apparatus, system, and a method of preparing a bioplastic material developed from a blend solution of GA and PVA.

In an aspect of the present disclosure, the apparatus for manufacturing the bioplastic material is described. The apparatus includes a panel which has a first end, a second end distal to the first end, and a plurality of walls extending from a periphery of the panel. The panel is configured to accommodate the blend solution of GA and PVA. In an embodiment, the panel is an acrylic panel, and the acrylic panel includes potassium poly-(methyl methacrylate). In an embodiment, the panel further includes an inlet configured to receive a dehydrant and cold air, and an outlet configured to discharge the cold air therethrough. The apparatus further includes a plurality of support members coupled to the first end and the second end of the panel and configured to adjust a slope angle of the panel. The slope angle is defined between a plane of the panel defined by the first end and the second end thereof and a horizontal plane. In an embodiment, the slope angle is in a range of 10° to 25°. The apparatus further includes one or more vibration generating units coupled to the plurality of support members and configured to vibrate the panel when the blend solution flows from the first end to the second end of the panel. In an embodiment, the vibration generating unit is a solenoid. In an embodiment, the apparatus further includes two or more stratified templates arranged vertically alternating with a plurality of textile layers. In an embodiment, the plurality of textile layers include a first layer, and a third layer, each made up of non-woven polypropylene fibers, and a second layer that is sandwiched between the first layer and the third layer, where the second layer is made up of loosened cotton fiber floss loaded with a dehydrant. The dehydrant is selected from the group consisting of phosphorus pentoxide ($P_4O_{10}$), calcium chloride, silica gel, and any combinations thereof. In an embodiment, the dehydrant is $P_4O_{10}$.

In another aspect of the present disclosure, a system for manufacturing the bioplastic material is provided. The system includes a cold air supply unit, a vacuum pump, and the apparatus fluidly coupled to the cold air supply unit and the vacuum pump. The apparatus includes the panel which has the first end, the second end distal to the first end, and the plurality of walls extending from a periphery of the panel. The panel is configured to accommodate the blend solution of the GA and PVA. In an embodiment, the panel is the acrylic panel, and the acrylic panel includes potassium poly-(methyl methacrylate). In an embodiment, the panel further includes the inlet configured to receive the dehydrant and cold air, and the outlet configured to discharge the cold air therethrough. The apparatus further includes the plurality of support members coupled to the first end and the second end of the panel and configured to adjust the slope angle of the panel. In an embodiment, the slope angle is in a range of 10° to 25°. The apparatus further includes one or more vibration generating units coupled to the plurality of support members and configured to vibrate the panel when the blend solution flows from the first end to the second end of the panel. In an embodiment, the vibration generating unit is the solenoid. In an embodiment, the apparatus further includes two or more stratified templates arranged vertically alternating with the plurality of textile layers. In an embodiment, the textile layers includes the first layer, and a the third layer, each made up of non-woven polypropylene fibers, and the second layer that is sandwiched between the first layer and the third layer, where the second layer is made up of loosened cotton fiber floss loaded with the dehydrant. The dehydrant is selected from the group consisting of phosphorus pentoxide ($P_4O_{10}$), calcium chloride, silica gel, and any combinations thereof. In an embodiment, the dehydrant is $P_4O_{10}$.

In another aspect of the present disclosure, a method of manufacturing the bioplastic material is provided. The method includes mixing a pre-determined concentration of GA and PVA via continuous stirring to obtain a homogenous blend solution, introducing the blend solution onto an electrostatically charged hydrophobic panel, heating the panel at a pre-determined temperature to thicken the blend solution. The method further includes adjusting the slope angle of the panel to accelerate fluid movement of the blend solution, vibrating the panel with the blend solution, and air-drying the blend solution on the panel to form the bioplastic material. The method further includes peeling off the bioplastic material from the panel.

The foregoing as well as other features and advantages of the present disclosure will be more fully understood from the following description, examples, and claims.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 15A illustrates *Pseudomonas* spp on nutrient agar plate, isolated from the buried bioplastic sheets, according to one embodiment of the present disclosure;

FIG. 15B depicts microscopic morphology of the *Pseudomonas* spp, according to one embodiment of the present disclosure;

FIG. 16A illustrates *Bacillus* spp on nutrient agar plate, isolated from the buried bioplastic sheets, according to one embodiment of the present disclosure;

FIG. 16B depicts microscopic morphology of the *Bacillus* spp, according to one embodiment of the present disclosure;

FIG. 17A illustrates *Rhizopus* spp on potato dextrose agar (PDA) plate, isolated from buried bioplastic sheets, according to one embodiment of the present disclosure; and FIG. 17B depicts microscopic morphology of the *Rhizopus* spp, according to one embodiment of the present disclosure.

DETAILED DESCRIPTION

Figure 1A:
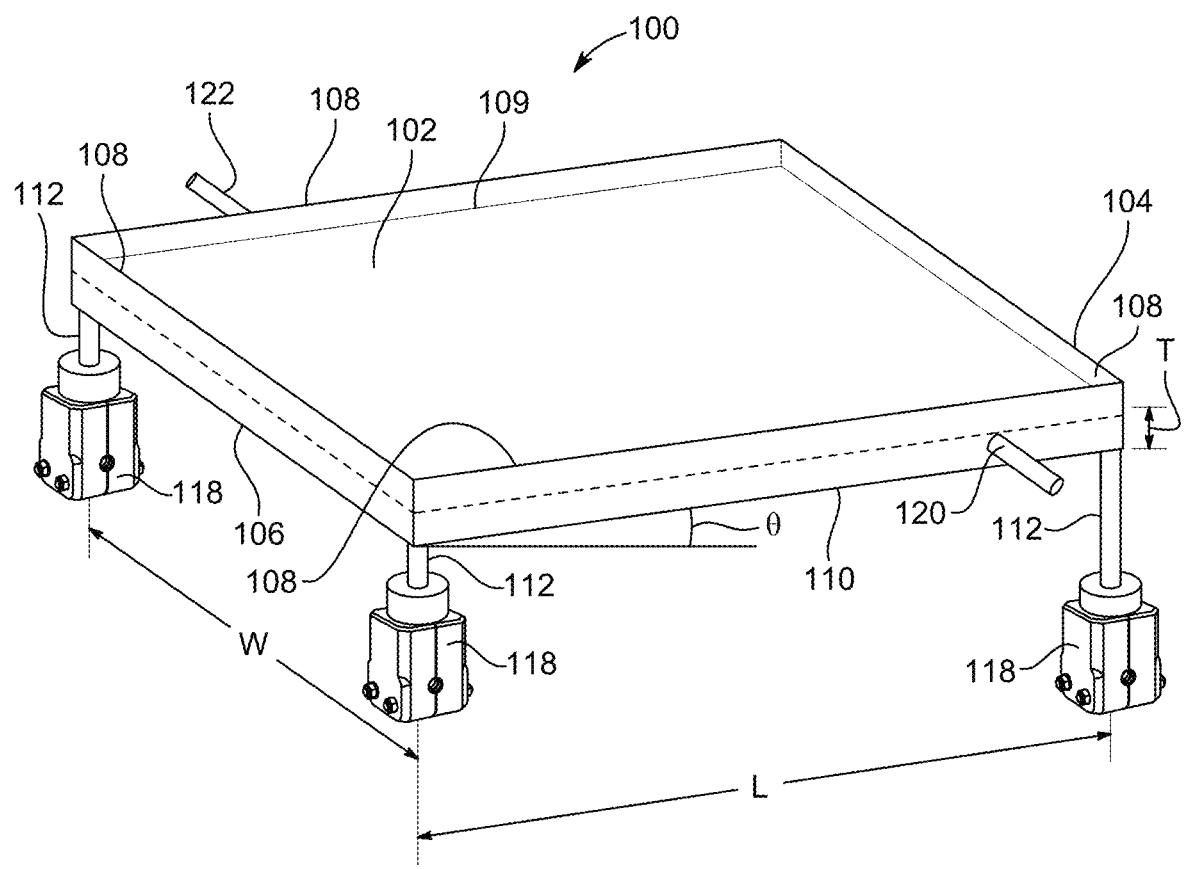
FIG. 1A is an apparatus for preparing a bioplastic material, according to one embodiment of the present disclosure.

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements. A skilled artisan will appreciate that various alternate embodiments and forms may be prepared. Examples, therefore, given are only for illustration purposes without any intention to restrict the embodiments to a given set of examples. Specific functional aspects are provided merely to enable a person skilled in the art to perform the invention and should not be construed as limitations of the invention. Any method steps and processes described herein are not to be construed as necessarily requiring their performance in the particular order discussed or illustrated, unless specifically identified as an order of performance. It is also to be understood that additional or alternative steps may be employed, unless otherwise indicated.

As used herein "blend solution" refers to a mixture of different substances, particularly GA and PVA in the context of the present disclosure.

As used herein, "bioplastic" refers to plastic materials produced from renewable biomass sources, such as vegetable fats and oils, corn starch, straw, woodchips, sawdust, recycled food waste, etc.

As used herein, "vibration" refers to a mechanical phenomenon whereby oscillations occur at an equilibrium point.

As used herein, "dehydrant" refers to any material that acts or supports in removing water.

As used herein, "vacuum" refers to a space entirely devoid of matter.

As used herein, "vacuum pump" refers to a device that draws gas molecules from a sealed volume to leave behind a partial vacuum.

As used herein, "electrostatically charged" refers to a deficiency or excess of electrons which occurs on ungrounded or insulating surfaces.

As used herein, "hydrophobic" refers to a property of a substance that repels water.

As used herein, "hydrophilic" refers to a property of a substance that attracts water.

As used herein, "bioplastic material" and "bioplastic sheets" have been used interchangeable throughout the specification.

The use of the singular herein includes the plural (and vice versa) unless specifically stated otherwise.

The use of the terms "include," "includes", "including," "have," "has," or "having," "comprise," "comprises," "comprising" or the like should be generally understood as open-ended and non-limiting unless specifically stated otherwise.

It is understood that the order of steps or order for performing certain actions can be changed so long as the intended result is obtained. Moreover, two or more steps or actions may be conducted simultaneously.

As used herein, the term "about" or "between" refers to a ±20% to ±10% variation from the nominal value unless otherwise indicated.

Embodiments of the present disclosure directed towards a an apparatus, system, manufacturing of a transparent bioplastic material or a bioplastic material from a blend solution of a gum arabica (GA) and a polyvinyl alcohol (PVA) using a vibrational casting method. The bioplastic sheet prepared with the apparatus by the method of the present disclosure is free of internal bubbles.

Figure 1B:
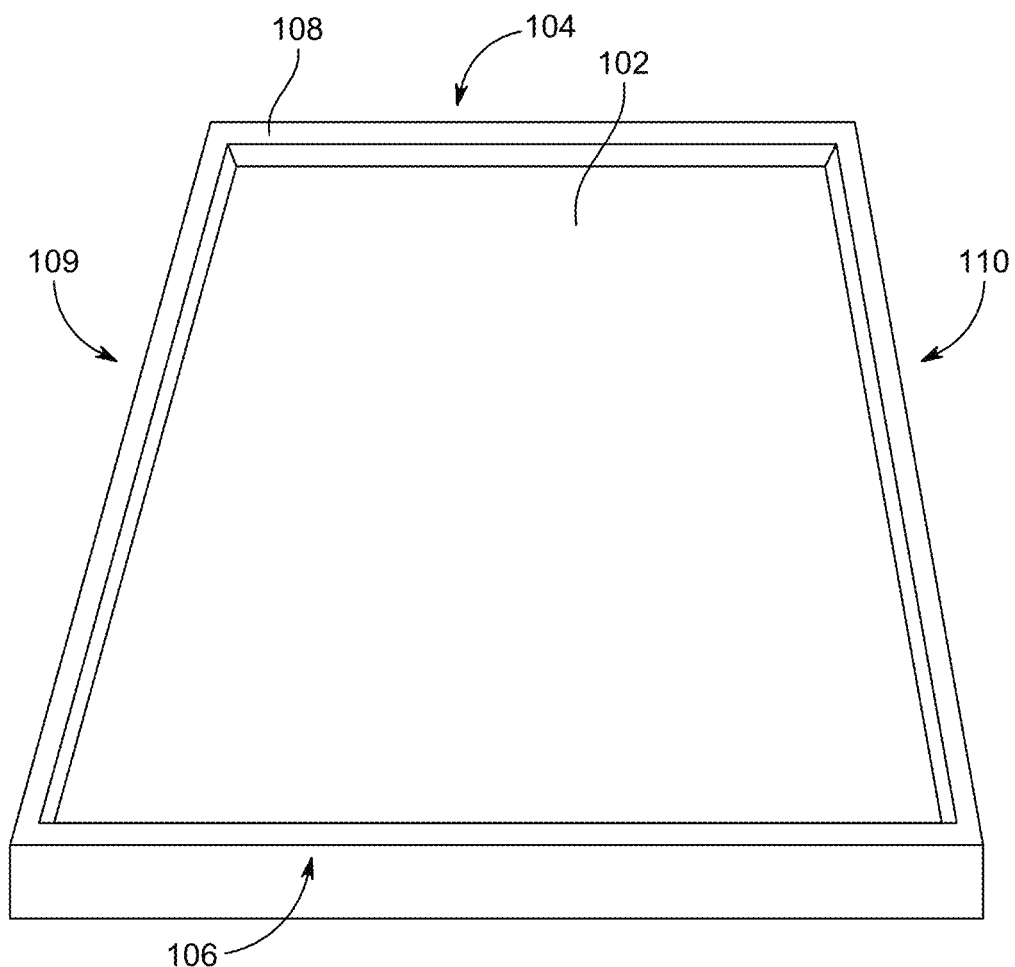
FIG. 1B is a perspective view of a panel of the apparatus of FIG. 1A, according to one embodiment of the present disclosure.

Referring to FIG. 1A, an apparatus 100 for manufacturing the bioplastic material is illustrated, according to an embodiment of the present disclosure. The apparatus 100 includes a panel 102 having a first end 104, a second end 106 distal to the first end 104, and a plurality of walls 108 extending from a periphery of the panel 102. The description of the panel 102 may be better understood when read in conjunction with FIG. 1B. As shown in FIG. 1A and FIG. 1B, the panel 102 has a rectangular shape having the first end 104 and the second end 106 defined along a longitudinal axis. The longitudinal axis is defined as an axis that passes along a longer length of the panel 102. The panel 102 further includes a first side end 109 and a second side end 110 defined along a transverse axis perpendicular to the longitudinal axis. The transvers axis is defined as an axis that passes along a shorter length of the panel 102. In some embodiments, the panel 102 may have a square shape, oval shape, or any other polygon shape known in the art to prepare bioplastic material in a required shape. The plurality of side walls 108 extends from the periphery of the panel 102 at the first end 104, the second end 106, the first side end 109, and the second side end 110 thereof. In one embodiment, the plurality of side walls 108 may together form an integral wall that extends along the periphery of the panel 102. In some embodiments, the plurality of walls 108 may include four individual walls, as shown in FIGS. 1A and 1B, extending from each of the four sides of the panel 102 such that each wall may be removably coupled to customize structure and dimension of the panel 102 based on the shape and size of the bioplastic material to be produced. The panel 102 is configured to accommodate the blend solution of GA and PVA. The plurality of walls 108 acts as a barrier to contain the blend solution in the panel 102. The panel has a length 'L', a width 'W', and a thickness 'T' defined based on a shape and size of the bioplastic material to be produced.

The apparatus 100 further includes a plurality of support members 112 coupled to the first end 104 and the second end 106 of the panel 102. As shown in FIG. 1A, the plurality of support members 112 includes a first pair of support members coupled to corners of the panel 102 at the first end 104 thereof and a second pair of support members coupled to corners of the panel 102 at the second end 106 thereof. In an embodiment, the first pair of support members and the second pair of support members together form the plurality of support members 112. In some embodiments, the plurality of support members 112 may include two support members, and one support member may be coupled to the first end 104 of the panel 102 and another support member may be coupled to the second end 106 of the panel 102. The plurality of support members 112 is configured to adjust a slope angle 'θ' of the panel 102, where the slope angle 'θ' is defined between a plane of the panel 102 defined by the first end 104 and the second end 106 thereof and a horizontal plane. In one embodiment, the support members 112 may be movable to adjust a height thereof such that the slope angle 'θ' (of the panel 102 may be adjusted with respect to the horizontal plane). In an example, the support member 112 may be provided with a telescopic arrangement, a threaded arrangement, or any other sliding arrangement that makes the support member 112 adjustable. In some embodiments, the support member 112 may be rigid member and replaced with another rigid member based on the slope angle 'θ' required for the production of bioplastic material.

The apparatus 100 further includes one or more vibration generating units 118 coupled to the plurality of support members 112. Particularly, a bottom end of each of the support members 112 is coupled to the one or more vibration generating units 118. In some embodiments, the vibration generating units 118 may be coupled to the panel 102 at the first end 104, the second end 106, the first side end 109, or the second side end 110. The one or more vibration generating units 118 are configured to vibrate the panel 102 when the blend solution flows from the first end 104 to the second end 106 thereof. In an embodiment, the vibration generating unit 118 is a solenoid.

Figure 1C:
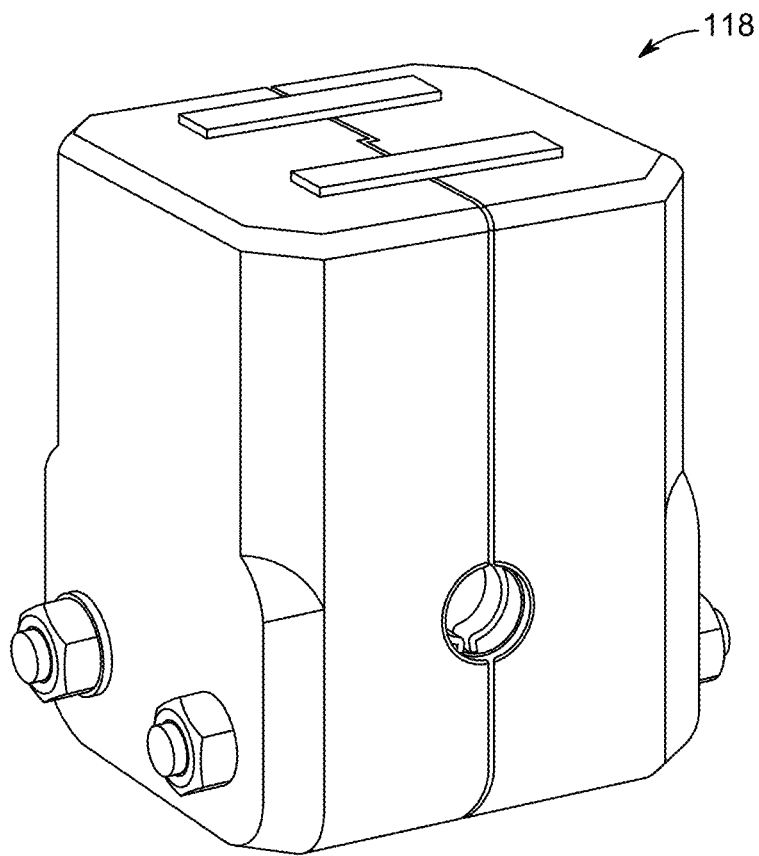
FIG. 1C illustrates a pictorial representation of a Kendrion™ original service release (OSR) series shaker solenoid cast in a plastic housing, according to one embodiment of the present disclosure.
Figure 1D:
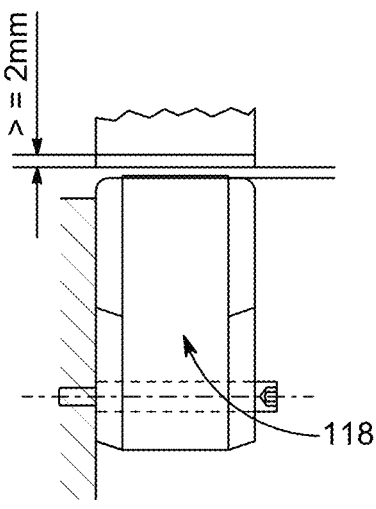
FIG. 1D and FIG. 1E illustrate two excitations coils in the OSR shaker solenoid cast, according to one embodiment of the present disclosure.
Figure 1E:
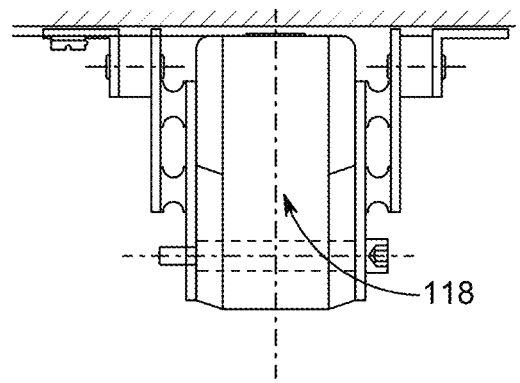

FIGS. 1C-1E illustrate pictorial representations of Kendrion™ original service release (OSR) series shaker solenoid cast consisting of two excitations coils cast in the plastic housing in the OSR shaker solenoid cast. A magnetic system of a vibrating solenoid is cast in a plastic housing. It consists of two excitation windings and the two halves of the magnetic body which are connected at the bottom by a permanent magnet. The magnetic circle is closed via the air gap by the body to be vibrated which represents the armature. The magnetic system is biased by the permanent magnet integrated into the magnetic body, generating a constant pulling force between magnetic body and armature. When an alternating current (AC)-voltage is applied to the excitation winding the force effect of the electromagnetic alternating field is superimposed on the force effect of the permanent magnet. In order to achieve the vibrating movement desired the useful load (the body to be vibrated) must be mounted to a base plate or a base in a manner capable of vibrating by means of vibrating metals, pressure springs or leaf springs. The vibrating solenoid must be magnetizable and must have a minimum thickness of 2 millimeter (mm).

All data apply to an operating frequency of 50 Hertz (Hz). The magnetic force values in the table are statically measured peak values for the air gap specified. The values are valid at 90% of a nominal voltage and at an operating temperature. A vibrating movement occurs when the solenoid mounts to a base plate or a base capable of vibrating, for example, pressure springs or leaf springs.

The original service release (OSR) shaker solenoids are compact by design, very useful for applications where reliable high performance is needed, but space is limited. The fully encapsulated bobbin and coils achieve reliable long-life service and maintenance-free operation. In addition, OSR shaker solenoids are not susceptible to dust or moisture when operated in rough or adverse conditions. The permanent magnetic attachment serves to mount the OSR shaker solenoid freely and detachable to the vibrating surface. Angle mounts permanently fix the OSR shaker solenoid to a vibrating surface. Phase angle controllers may be installed separately for the fine adjustment of vibration through an alternating or direct current (via an integrated one-way rectifier). In addition, the phase controller may be Deutsche Industrie Norm (DIN)-rail mounted within cabinets with minimal space.

Figure 1F:
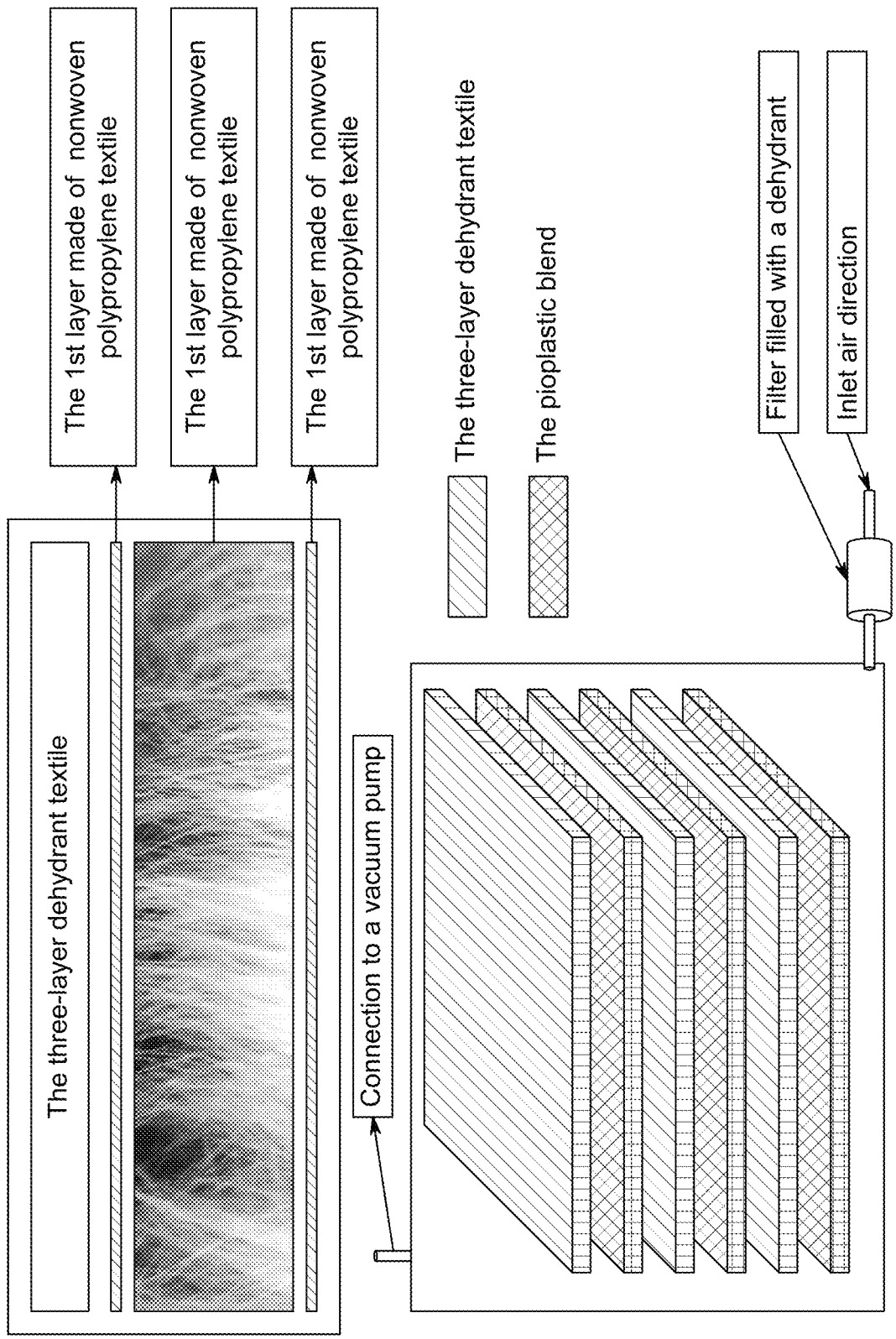
FIG. 1F illustrates a stratified air-dryer including a dehydrant loaded on a three-layer polypropylene non-woven textile, according to one embodiment of the present disclosure.
Figure 1G:
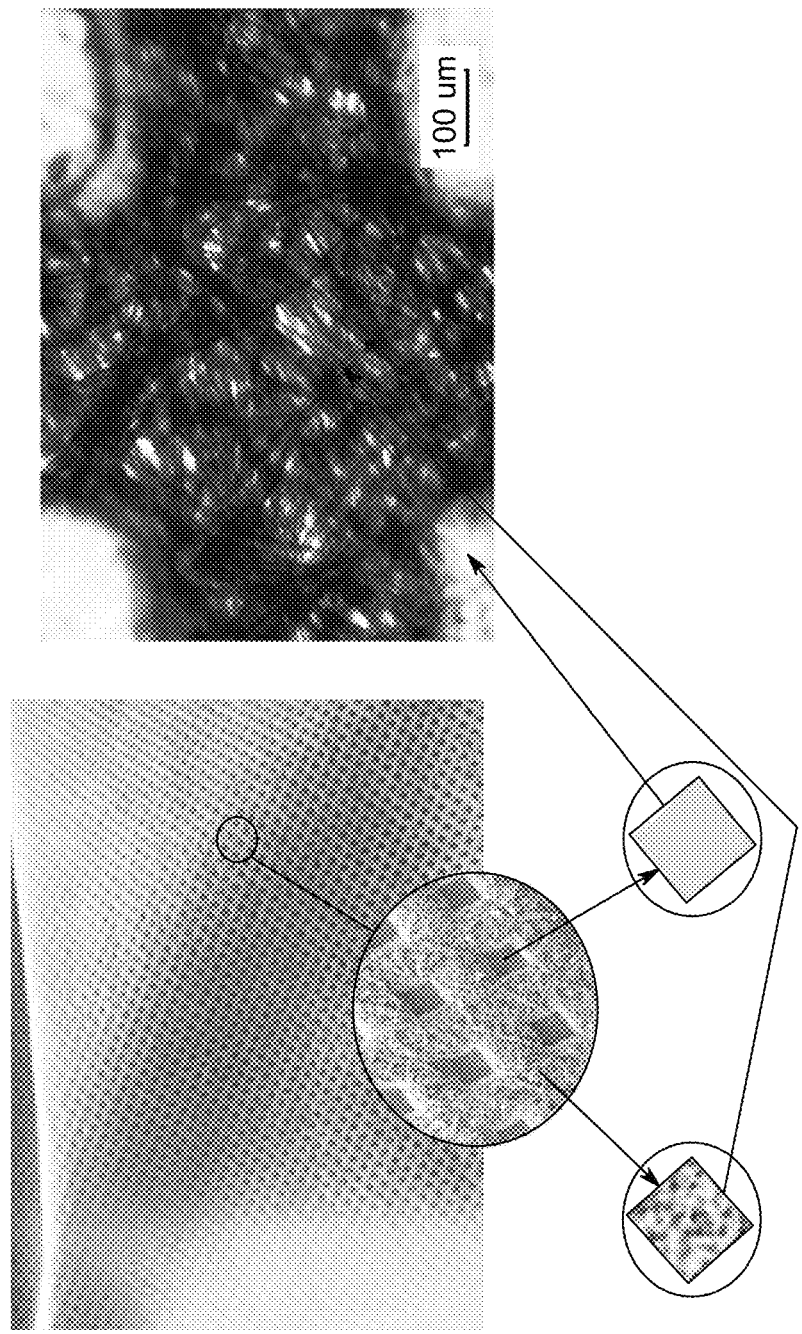
FIG. 1G illustrates optical images of the polypropylene non-woven textile, according to one embodiment of the present disclosure.

The most critical problem concerning to the manufacture of bioplastic sheets is the drying process in obtaining high quality products. One of the challenges associated with the drying process is the high hydrophilic nature of the bioplastic sheets blended from the mixture of GA and PVA (1:1). Due to the presence of water, the drying time was substantially long. The apparatus 100 accelerates the dehydration process of the bioplastic sheets. Referring to FIG. 1F, a stratified air-dryer including a dehydrant loaded on a three-layer polypropylene non-woven textile, to remove water from the bioplastic material, is illustrated. In one embodiment, the panel 102 includes a plurality of stratified templates arranged vertically alternating with a plurality of textile layers. The plurality of textile layers includes a first layer including non-woven polypropylene fibers, a second layer including loosened cotton fiber floss loaded with a dehydrant, and a third layer including non-woven polypropylene fibers. The second layer is sandwiched between the first layer and the third layer. In another embodiment, three-layer polypropylene textile (TPLT) may also be used. The optical images of the polypropylene non-woven textile are depicted in FIG. 1G. TLPT may prove to be selected for part of panel due to its high content of alpha cellulose that is well known by its high hydrophilicity that is essential to have good affinity to both moisture molecules as well as the dehydrant crystals. In another embodiment, the dehydrant is selected from the group consisting of phosphorus pentoxide ($P_4O_{10}$), calcium chloride, or silica gel and any combinations thereof. In yet another embodiment, the dehydrant is $P_4O_{10}$. In an embodiment, The manner of loading a dehydrant onto the cellulosic fibers can be includes the steps of: a) air-drying the cellulosic fibers; b) preparing a saturated solution of the dehydrant; c) soaking the cellulosic fibers into the saturated solution by the aim of vacuum forces to ensure the exact immersion and saturation of the fiber cells and penetration of the saturated solution into the cell cavity as well as the cell wall through the internal border pits of the cellulosic fibers; d) discarding the excess saturated solution, and the cellulosic fibers were allowed to be air-dried and, finally, oven-dried at 80°±5° C. for 2 hours.

Figure 2:
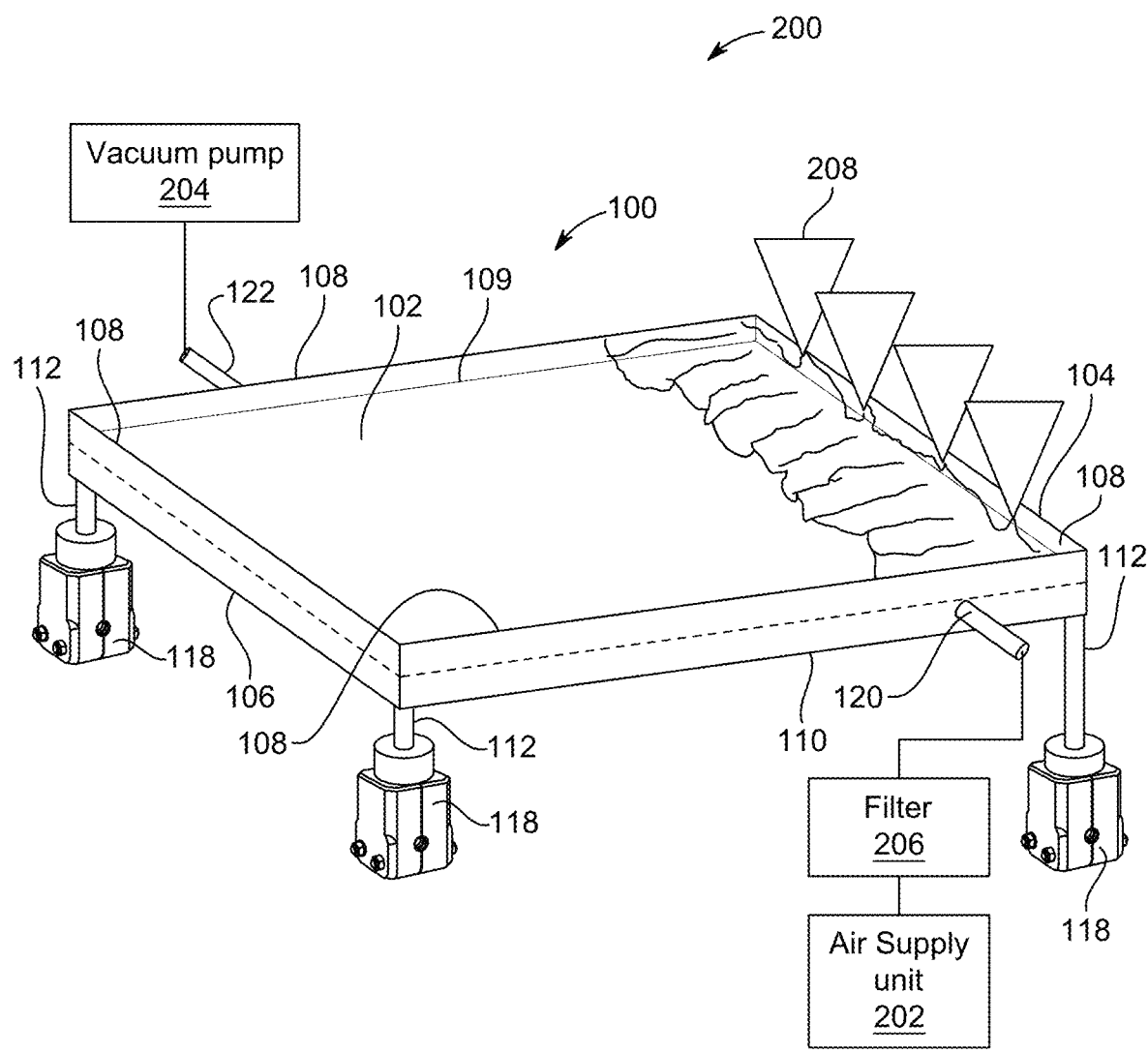
FIG. 2 illustrates a system for preparing the bioplastic material, according to one embodiment of the present disclosure.

Referring to FIG. 2, a system 200 for manufacturing the bioplastic material is illustrated, according to an embodiment of the present disclosure. The system 200 includes a cold air supply unit 202 fluidly coupled to the inlet 120 of the panel 102. In an example, the cold air supply unit 202 may be an air conditioning unit to reduce temperature of ambient air and store the cold air. In some embodiments, the cold air supply unit 202 may be controlled manually or automatically to supply cold air to the panel 102 during the production of bioplastic material. The system 200 further includes a vacuum pump 204 fluidly coupled to the outlet 122 of the panel 102. The vacuum pump 204 may be configured to suck the cold air supplied to the panel 102 at a desired rate for efficient drying of the bioplastic material and also to prevent the air from being trapped during the production process. The system 200 further includes the apparatus 100 fluidly coupled to the cold air supply unit 202 and the vacuum pump 204 during the manufacturing of the bioplastic material. In an embodiment, the system 200 further includes a filter 206 having the dehydrant stored therein. The filter 206 is configured to fluidly couple with the inlet 120 to supply the dehydrant. The system 200 further includes one or more depositing members 208 for pouring the blend solutions onto the panel 102. Particularly, the one or more depositing members 208 are positioned proximate the first end 104 of the pane 102.

Figure 3:
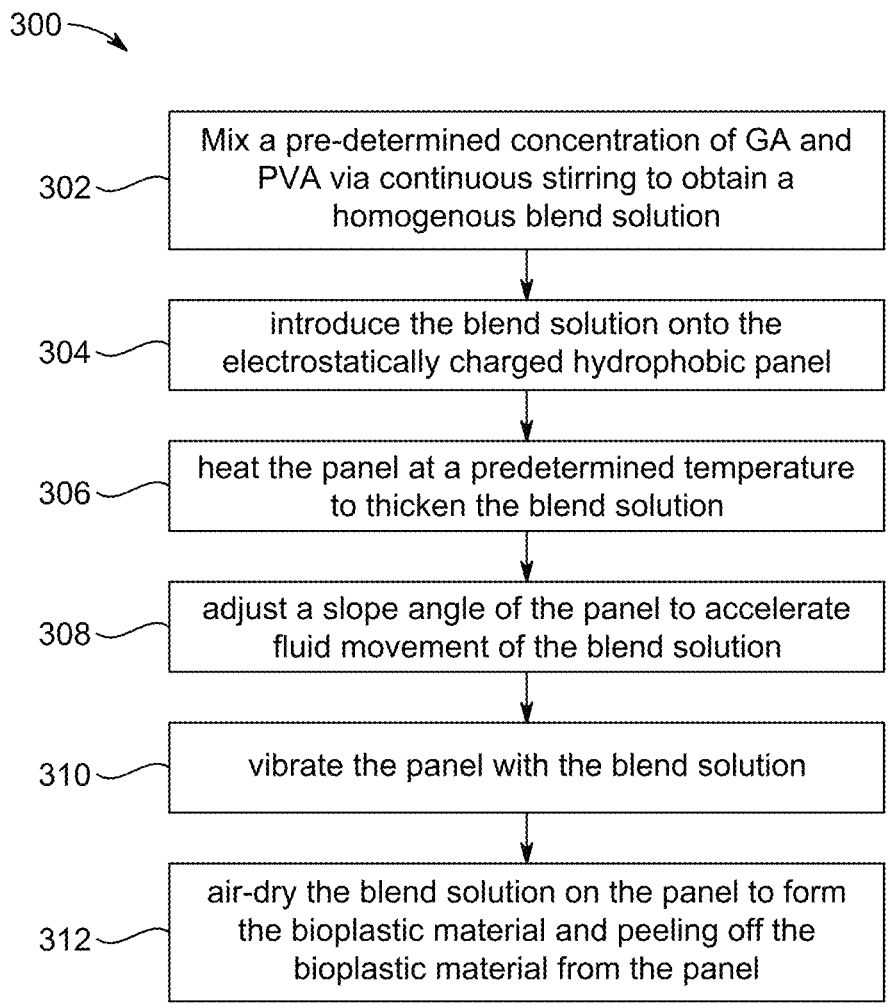
FIG. 3 illustrates a method for preparing the bioplastic material, according to one embodiment of the present disclosure.

Referring to FIG. 3, a schematic flow diagram of a method 300 of making the bioplastic material is illustrated. The order in which the method 300 is described is not intended to be construed as a limitation, and any number of the described method steps can be combined in any order to implement the method 300. Additionally, individual steps may be removed or skipped from the method 300 without departing from the spirit and scope of the present disclosure.

At step 302, the method 300 includes mixing a pre-determined concentration of GA and PVA via continuous stirring to obtain a homogenous blend solution. In an embodiment, the concentration of GA and PVA was same. In an other embodiment, the concentration of GA and PVA was different. In another embodiment, the pre-determined concentration of the GA and PVA is 5%, each, respectively.

At step 304, the method 300 includes introducing the blend solution onto the electrostatically charged hydrophobic panel 102. In an embodiment, the blend solution may be introduced into the acrylic panel manually. In an embodiment, the electrostatically charged hydrophobic panel is an acrylic panel. In an embodiment, the acrylic panel includes potassium poly (methacrylate).

At step 306, the method 300 includes heating the panel 102 at a predetermined temperature to thicken the blend solution. In an embodiment, the blend solution was heated till a desired viscosity of the blend solution was attained. In an embodiment, the predetermined temperature is between 15 to 35° C.

At step 308, the method 300 includes adjusting a slope angle of the panel to accelerate fluid movement of the blend solution. The slope angle allows for continus flow of the blend solution from the first end of the panel 104 to the second end of the panel 106. In an embodiment, the slope angle of the blend solution is in a range of 10° to 25°.

At step 310, the method 300 includes vibrating the panel with the blend solution. In an embodiment, the vibration is accomplished with the vibration generating unit 118. In n embodiment, the vibration generating unit 118 is a solenoid. In an other embodiment, the frequency of vibration with the vibration generating unit 118 was maintained at about 50 Hertz (Hz).

At step 312, the method air-drying the blend solution on the panel 102 to form the bioplastic material and peeling off the bioplastic material from the panel 102. In an embodiment, the slope angle of the panel 102 is re-adjusted to zero degrees prior to air-drying the blend solution. In an embodiment, the re-adjustment of the slope angle is to ensure a uniform thickness of the bioplastic material on the panel.

EXAMPLES

The disclosure will now be illustrated with examples, which are intended to illustrate the working of disclosure and not intended to take restrictively to imply any limitations on the scope of the present disclosure.

Example 1: Materials Required

Figure 4A:
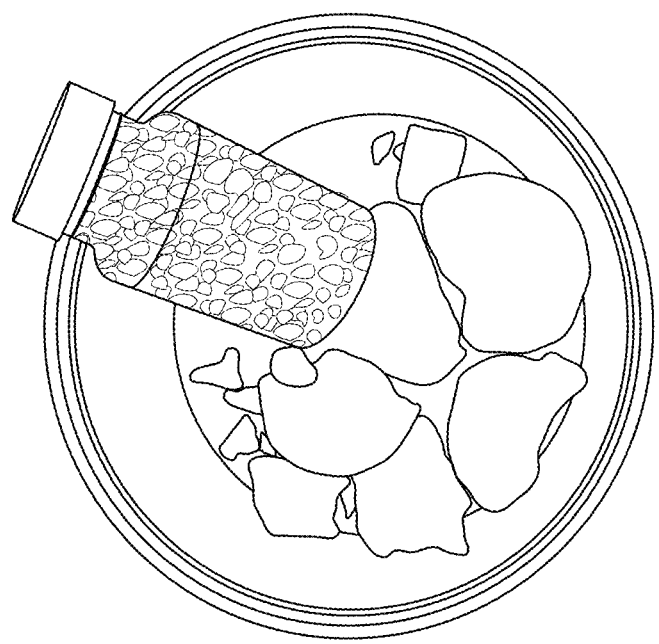
FIGS. 4A-4C illustrate gum arabic (GA), used as a precursor for preparing the bioplastic material, in the form of coarse granules, powder, and a solution, respectively, according to one embodiment of the present disclosure.
Figure 4B:
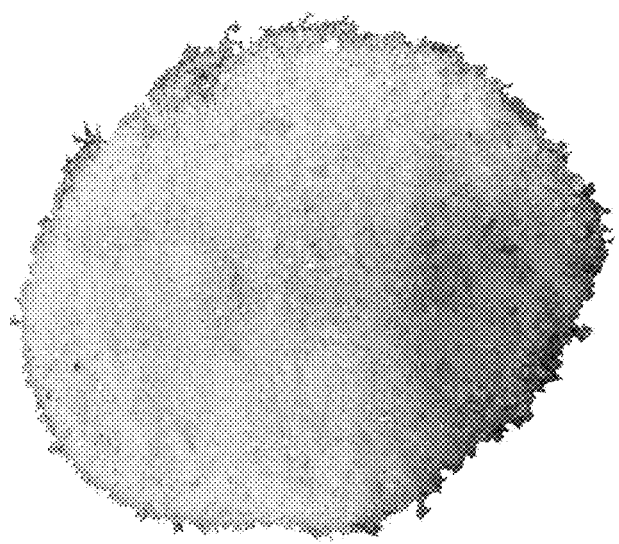
Figure 4C:
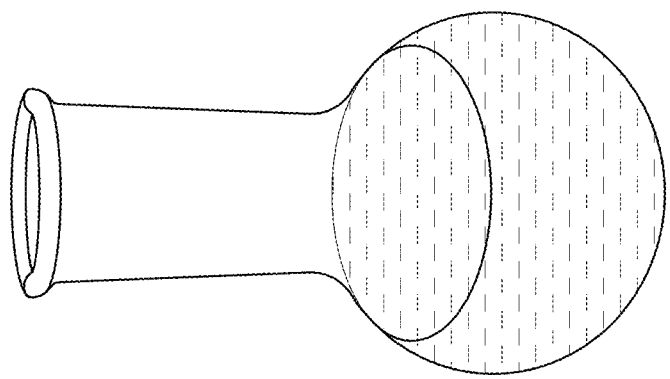

FIGS. 4A, 4B and 4C shows GA used as the principle precursor for the synthesis of three bioplastic sheets in the form of coarse granules (FIG. 4A), powder (FIG. 4B) and solution (FIG. 4C). The GA with molecular weight (MW: $1.827 \times 10^6$ g/mole) was collected from Acacia senegal trees habituated at Hada Al-Sham (about 120 km apart from Jeddah).

Example 2: Process for Preparing the Precursor Solution of GA

Figure 5:
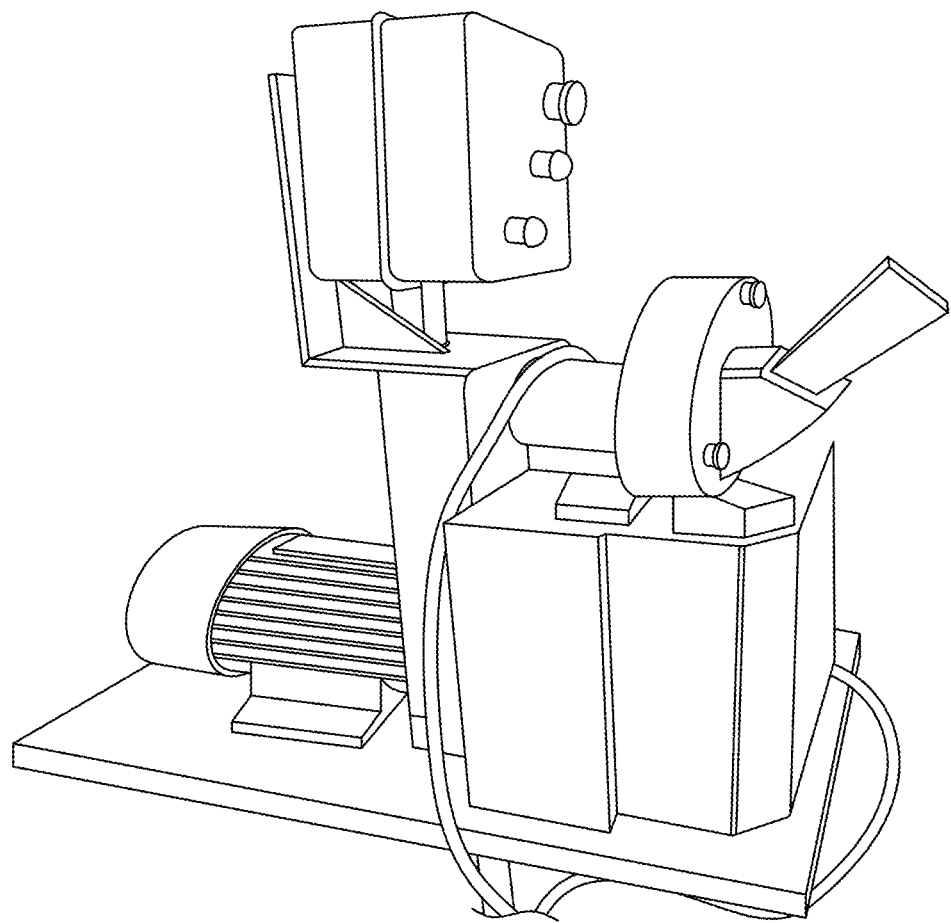
FIG. 5 illustrates a grinding machine used for preparing the precursors, according to oe embodiment of the present disclosure.
Figure 6:
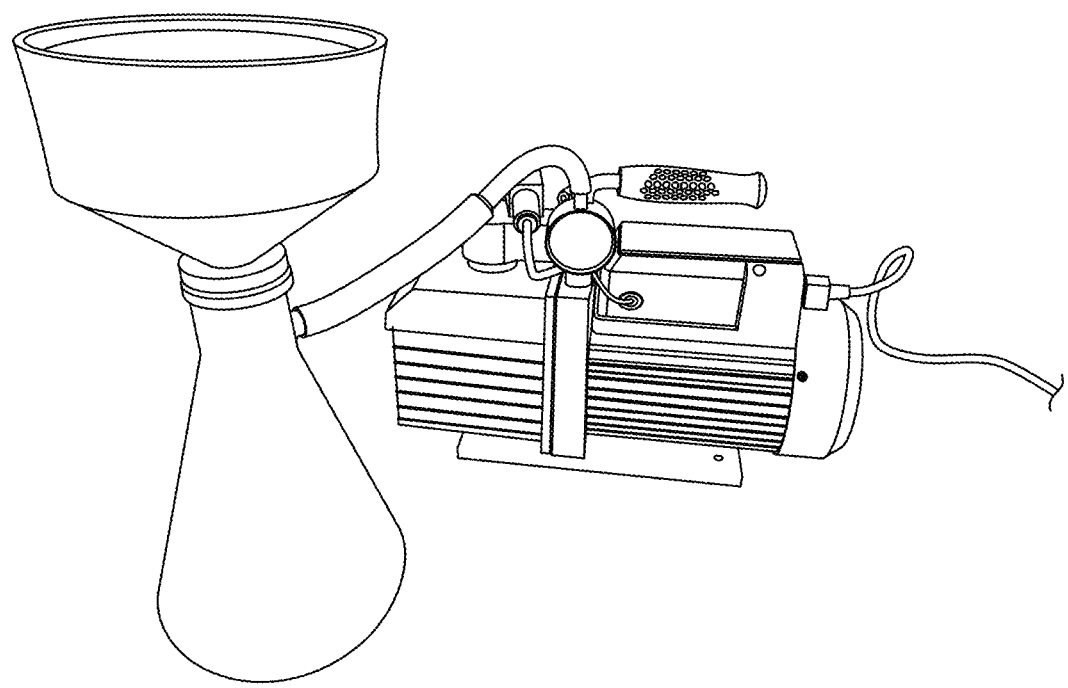
FIG. 6 illustrates a vacuum filtration apparatus, used for synthesis of the bioplastic material, according to one embodiment of the present disclosure.

To prepare 5 percentage weight (wt %) aqueous solution of the GA, the crude granules were ground using a grinding machine (FIG. 5), and passed through a standard sieve of 60 mesh and be retained on 80 mesh. The obtained air-dried sieved powder (60/80 mesh) was dissolved in de-ionized water at ambient temperature (25 degree centigrade (° C.)) and heated up to 80° C. with continuous stirring until all the particles were completely dissolved. The clear solution (FIG. 4C) was obtained by removal of insoluble components by vacuum filtration (FIG. 6).

Example 3: Process of Preparing the Precursors of PVA

Figure 7C:
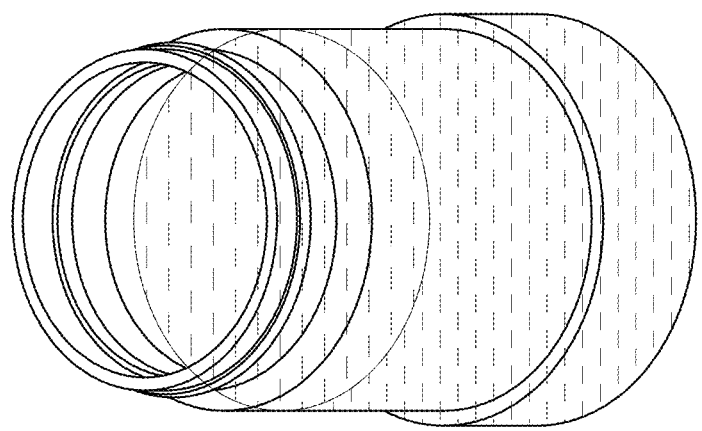
FIGS. 7A-7C illustrate a polyvinyl alcohol (PVA), used as a modifier precursor for preparing the bioplastic material, in an analytical-grade bottle, in the form of fine granules, and a solution, respectively, according to one embodiment of the present disclosure.
Figure 7B:
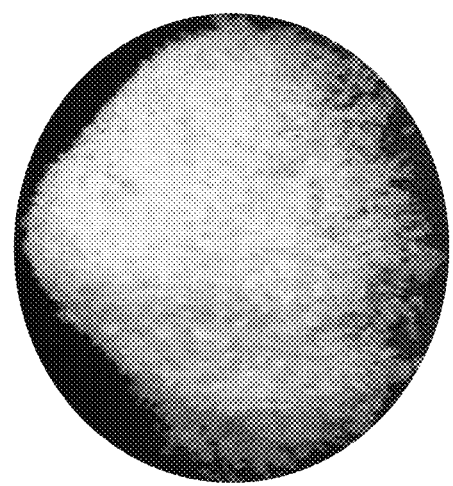
Figure 7A:
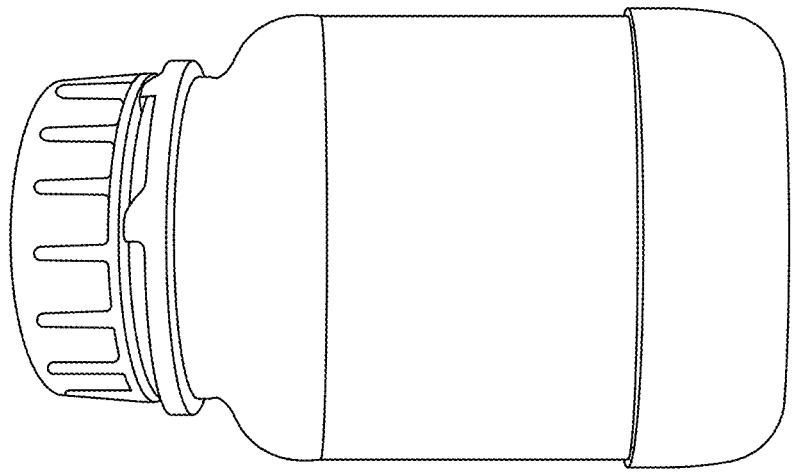
Figure 8:
FIG. 8 illustrates the bioplastic material, in form of a sheet, prepared from GA, and PVA in a weight ratio (w/w) of 1:1, according to one embodiment of the present disclosure.

The PVA was used as a modifier precursor for the synthesis of the three bioplastic sheets. The PVA used for this study was American chemical society (ACS) reagent, MW: 88000 Da, and 88% deacetylated that was blended with the GA to prepare the sheets using de-ionized water as a solvent. (FIG. 7A-7C).

Example 4: Preparation of the Blend Solution

Three different blend solutions of GA/PVA were prepared by mixing 5% wt of GA and PVA in aqueous solutions, in different weight ratios, with continuous stirring until the solution becomes completely homogenous. The different weight ratios of GA and PVA used in the study are illustrated in Table 1. The stirring process is essential, and it must be calm to ensure, no air bubbles are introduced into the aqueous solution. After obtaining the complete homogeneity for the blend solution, the bubble free blend solution was poured onto a clean panel with prominent frame and was evaporated at room temperature.

TABLE 1

GA/PVA ratio and precursor allocation in 100 millilitre (mL).

| Blend No. | GA/PVA weight ratio | Precursor allocation in 100 mL | |
|---|---|---|---|
| | | GA (ml) | PVA (ml) |
| 1 | 1/0 | 100 | 0 |
| 2 | 1:1 | 50 | 50 |
| 3 | 0/1 | 0 | 100 |

Example 5: Preparation of the Bioplastic Material or Bioplastic Sheets

An acrylic panel 102 material chemically made up of poly-(methyl methacrylate) was chosen due to its non-sticky nature with the blend solutions. Also, the bioplastic sheets formed may be easily peeled off from the panels after drying and curing.

Example 6: Free Horizontal Flow for Pouring the Blend Solution

The pouring process of the blend solution onto an acrylic panel was done by application of the free horizontal flow method for production of transparent biodegradable films using the apparatus 100 as described in FIG. 1A. The free horizontal flow offers several benefits, especially ease of casting the biopolymers, GA and PVA. The blend solution was poured onto an acrylic panel 102, after adjusting the slope angle of the acrylic panel 102 to about 15° relative to the ground. The purpose of creating the slope angle is to accelerate the fluid movement of the blend solution. The slow motion of the fluid protects its matrix from forcing any air bubbles inside it. Once the blend solution reaches from the first end 104 of the acrylic panel 102 to the second end 106 of the acrylic panel 102, the slope angle was re-adjusted to be zero degrees. The exact horizontality of the acrylic panel ground ensures production of high quality sheets that are identical in their thickness. In an embodiment, the thickness of the bioplastic sheets was controlled by two critical actions: a) pouring a definite quantity of blend solution on the same panel area, and b) accurate adjustment of viscosity of the blend solution.

The bioplastic sheet synthesized from the blend solution of GA and PVA in a ratio of 1:1 (FIG. 18), were characterized by various analytical techniques to confirm their formation.

Example 8: Characterization of the Bioplastic Material

Fourier transform infrared (FT-IR): For studying the chemical structure of the three bioplastic blend solutions (GA/PVA=1/0, 1/1 and 0/1), functional groups were studied using a Bruker Tensor 37 FTIR spectrophotometer. The samples were oven-dried at 100° C. for 4-5 hours (h), mixed with potassium bromide (KBr) in a ratio of 1:200 (w/w) and pressed under vacuum into pellets. The FTIR-spectra of the samples were recorded in the transmittance mode between 4000-500 centimeter$^{-1}$ (cm$^{-1}$).

X-Ray Diffraction (XRD): The XRD spectra of the three bioplastic sheets were measured by using XRD 7000 Shimadzu diffractometer (Japan). The system contains a rotating anode generator with a copper target and wide-angle powder goniometer. The measurements were achieved using CuKα radiation generated at 30 kilo Volt (kV) and 30 milli Ampere(mA). The CuKα radiation is constituted from Kα1 (0.15406 nanometre (nm)) and Kα2 (0.15444 nm) components, and the resultant XRD data has both components. The resultant radiation is filtered out from the data using a single-channel analyzer on the output from the semiconductor detector, without influencing the data. Each of the divergence and scatter slits was 1° and the receiving slit was 0.15 milli metre (mm) at the same radius. Dried bioplastic sheets (about 0.5 gram (g)) were mounted onto a quartz substrate using several drops of diluted amorphous glue. All samples were scanned in 2 θ° range varying from 5° to 40°. All the experiments were applied in the reflection mode at a scan speed of 4°/min in steps of 0.05°.

Crystallinity Index (CI): After smoothing the resultant crystalline peaks from the diffraction intensity profiles, the CI was calculated by dividing the diffractogram area of crystalline cellulose by the total area of the original diffractogram. The area under the curve was estimated by summing of adjacent trapezoids using Excel (Microsoft, United States of America (USA)).

Thermal Analysis: A thermal analysis characterization was done for the three bioplastic blend solutions. The thermogravimetric analysis (TGA) and the differential thermal analysis (DTA) of each blend was performed by using a Seiko & star 6300 analyzer, Central Laboratory, Faculty of Science, Alexandria University, Egypt. Heating scans were done from 30° C. up to the final maximum temperature of 550° C. with a heating rate of 20° C./min in nitrogen atmosphere.

Surface Roughness (SR): The SR was investigated by atomic force microscopy (AFM) by using Omicron VT AFM. XA to see the membranous surfaces in full three-dimensional structure up to the nanometric scale. The method may be applied to hard or soft synthetic materials as well as biological structures (tissues, cells, and biomolecules) irrespective of their opaqueness or conductivity. The AFM topography investigations were performed by Omicron VT AFM. XA.

Biodegradation by Bacteria and Fungi: The soil used for burying the bioplastic samples were obtained from the Agricultural Research Station (ARS) of the Faculty of Meteorology, Environment and Arid Land Agriculture of King Abdullaziz University in Hada Al-Sham. The site soil had a potential of hydrogen (pH) ranging from 7.1 to 7.9. The organic matter, $CaCO_3$ and cation exchange capacity were low.

Isolation of Microbial Communities: One gram of each soil sample was suspended in sterile distilled water and allowed to stand for several minutes. After that, the supernatant was serial diluted among six tubes and 1 ml from each dilution was plated in nutrient agar (Oxoid) for bacterial isolation while using potato dextrose agar medium (PDA) for fungi isolates. Finally, the plates were incubated at 30° C. for 2-7 days in order to count the bacteria and for 7-10 days at 25° C. to count the fungi. The microorganisms were isolated and identified by using standard biochemical tests based on the cultural and morphological characters.

Sample preparation and soil burial studies: The different bioplastic samples were cut into 2×2 cm pieces and buried in the soil that wear in boxes (1 L)/sample at a depth of 10 cm. All pieces were weighed before being placed in the soil and they were between 0.040-0.038 mg. The soil boxes were placed in the laboratory, and the moisture of the soil was adjusted by the addition of sterile water to compensate water loss through evaporation. A hole at the bottom of the boxes was put to drain the excess water through it. Soil samples were taken carefully after 30 days and 60 days to isolate and count the microorganism's community and observe the different between them. Also, to observe the morphological change in the samples surface as a result of degradation.

Statistical design and analysis: Randomized complete block design was used to evaluate the different properties of the three bioplastic sheets blended from the aqueous solutions of GA, and PVA. Statistical analysis of the recorded data was done using the analysis of variance procedure and least significant difference test (LSD) at 0.05. Results and Discussion Illustration of the ease of peeling of the bioplastic membrane from the acrylic panel. The ease of peeling the bioplastic membrane from the acrylic substrate can be illustrated based on the following reasons:
1) For surface energy of the casting substrate, materials with relatively low surface energy is considered as non-sticky surfaces and vice versa. Accordingly, the acrylic panel was found to have moderate surface energy (41 dynes/cm) can be considered as a non-sticky surface as presented at Table 2.
2) Electrostatic charge: The acrylic panel 102 is a prolific static generator. The back-and-forth motion of wiping an acrylic surface creates positive and negative surface charges that attract and hold small particles. Variations in the surface charges can lead to unpredictable release of aggregated particles, threatening contamination-sensitive material.

TABLE 2

Surface properties of poly-(methyl methacrylate) compared to some other important polymeric insulators.

| Insulator polymer | Surface energy Dynes/cm | Contact angle degrees |
|---|---|---|
| Polyethersulfone | 46 | 90° |
| Polymethylmethacrylate | 41 | 82° |
| Polytetrafluoroethylene | 19 | 120° |

Figure 9:
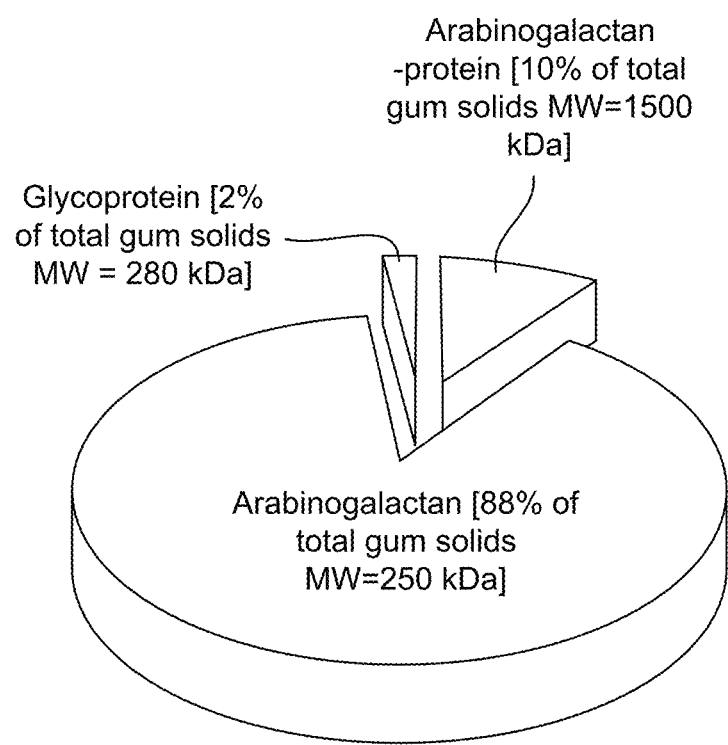
FIG. 9 illustrates chemical constituents of the GA used as the precursor for preparing the biomaterial, according to one embodiment of the present disclosure.
Figure 10:
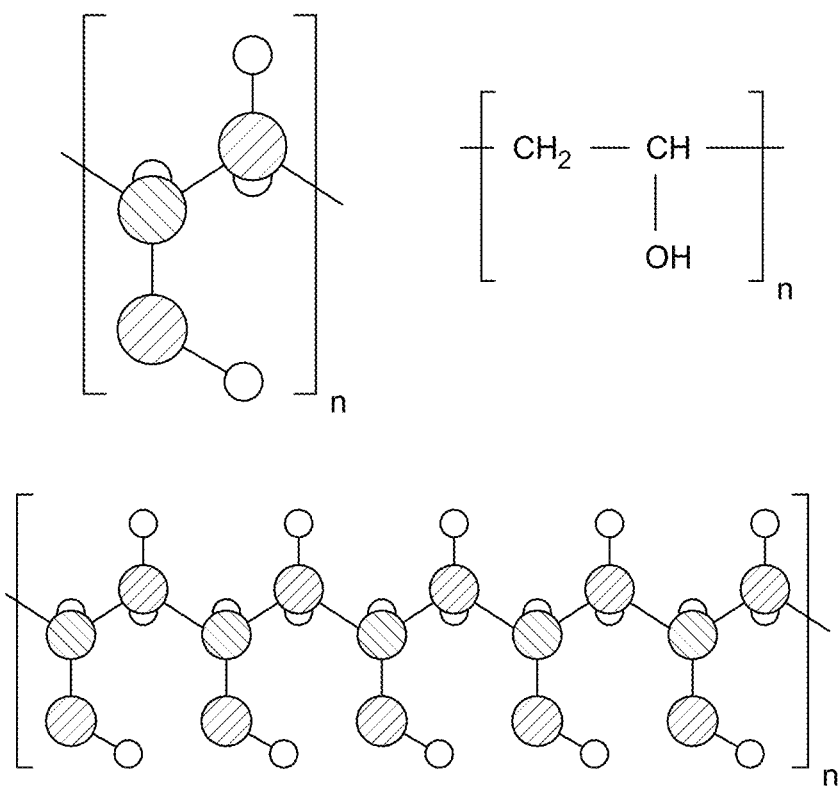
FIG. 10 illustrates the chemical structure of PVA, according to one embodiment of the present disclosure.

FIG. 9 clearly shows that the GA is chemically constituted from three components, namely Arabinogalactan that constitutes about 88% of total gum solids having a molecular weight (MW) of 250 Kilo Dalton (kDa), arabinogalactan-protein complex (10% of total gum solids and MW=1500 kDa), and glycoprotein (2% of total gum solids and MW=280 kDa). According to the chemical structure of PVA presented in FIG. 10 with the formula of $[CH_2CH(OH)]_n$, it has three atoms, namely carbon, hydrogen, and oxygen that they are principally constitute the GA matrix.

Figure 11:
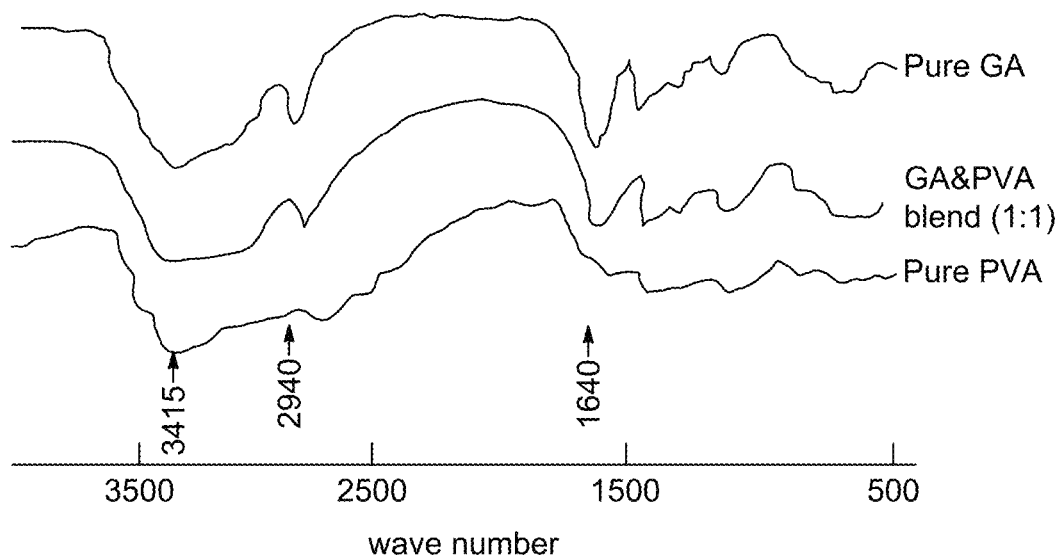
FIG. 11 illustrates fourier transform infrared (FT-IR) spectra, of three bioplastic sheets, obtained with various weight ratios (w/w) of GA and PVA, according to one embodiment of the present disclosure.

FIG. 11 clearly shows that the FT-IR spectra of the three bioplastic sheets are dominated by the strong and broad O—H stretching vibrations at 3416 $cm^{-1}$. The C—H stretching modes are riding over the board peak at 2939 $cm^{-1}$. The carbonyl stretching modes are observed at 1641 $cm^{-1}$ together with bulk ring mode at 1426 $cm^{-1}$. The characteristic C—O—C antisymmetric stretching mode was detected at 1047 $cm^{-1}$. The similarities between the three FT-IR spectra in their principal peaks are due to their common functional groups.

Figure 12:
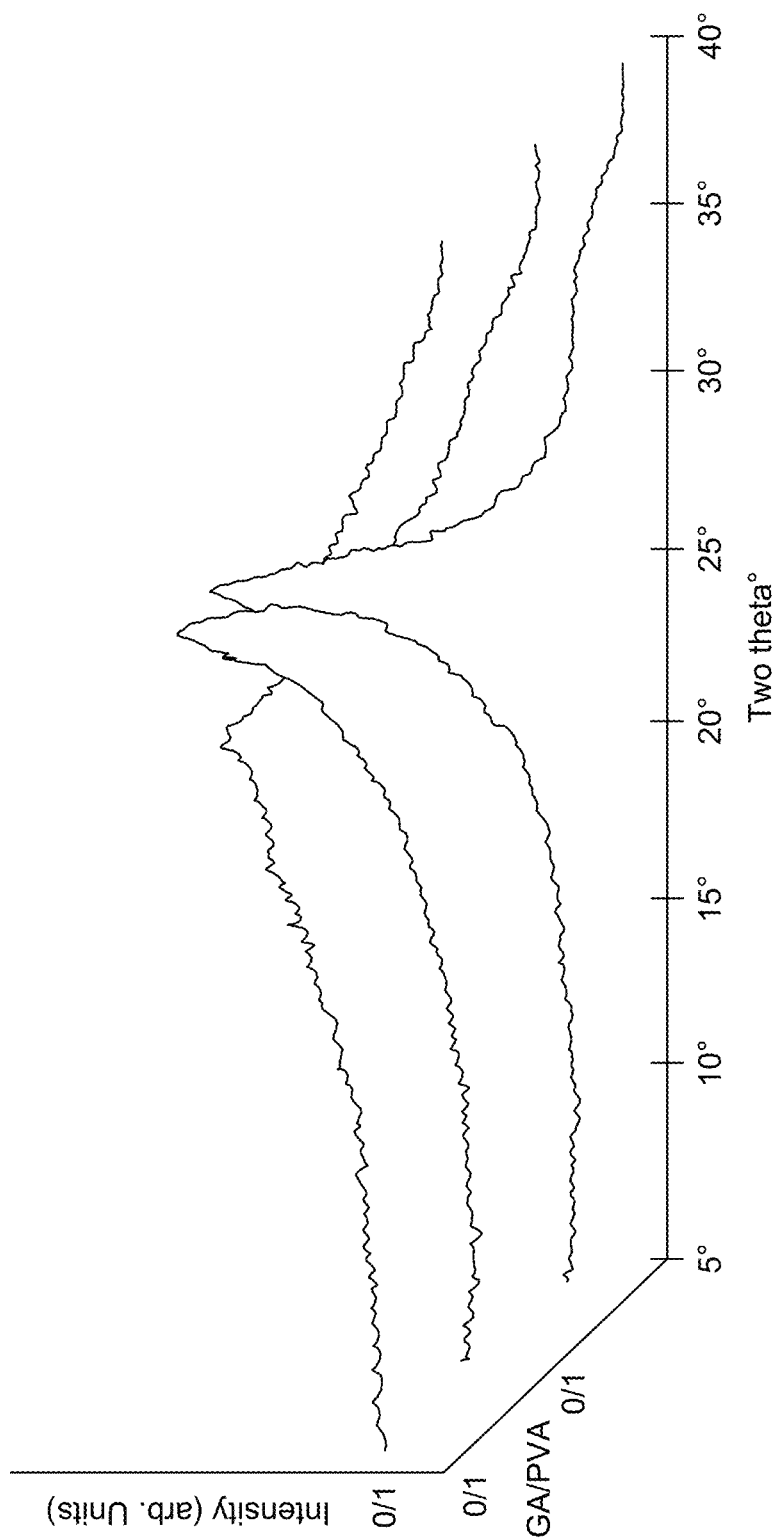
FIG. 12 illustrates X-ray diffraction (XRD) diffractograms of the three bioplastic sheets, according to one embodiment of the present disclosure.

The XRD technique has been extensively used to determine the crystallinity of polymeric blends. The maximum intensity of the GA-broad diffractogram was obtained at $2\theta=20°$ (FIG. 12) that confirms the amorphous nature of the gum arabic. In addition, FIG. 12 shows pure PVA known as a semi-crystalline polymer exhibited a typical peak at $2\theta=19.9°$. The crystallinity index values increased with the increasing in the percentage of PVA in the blend solution.

The CI is a useful indicator about the physical, chemical, and mechanical properties of a material. For the bioplastic blends, the CI values were found to be increased from 18.9% (for pure GA) up to 53.7% (for pure PVA) as shown in Table 3. Accordingly, it is clear that the increase in the CI of the bioplastic blends can be attributed to the increasing of the PVA allocation in the blend solution.

TABLE 3

Mean values[1-4] of the crystallinity index (CI) of the three bioplastic sheets blended from GA and PVA.

| Blend no. | GA/PVA | CI, % |
|---|---|---|
| 1 | 1/0 | 18.8 [0.24] |
| 2 | 1/1 | 36.2 [0.37] |
| 3 | 0/1 | 53.7 [0.45] |

[1]Means with the same letter are not differed significantly at 5% level.
[2]Each value is an average of 3 samples.
[3]Based on original oven-dry weight.
[4]Values between parentheses are the standard deviations.

Thermal analysis includes three different techniques, namely thermogravimetric analysis (TGA), differential thermal analysis (DTA) and differential scanning calorimetry (DSC). The TA detects the inter-atomic and inter-/intra-molecular interactions as related to an imposed external change in temperature. It is essential for investigating physical properties of materials throughout their entire life cycle.

Figure 13:
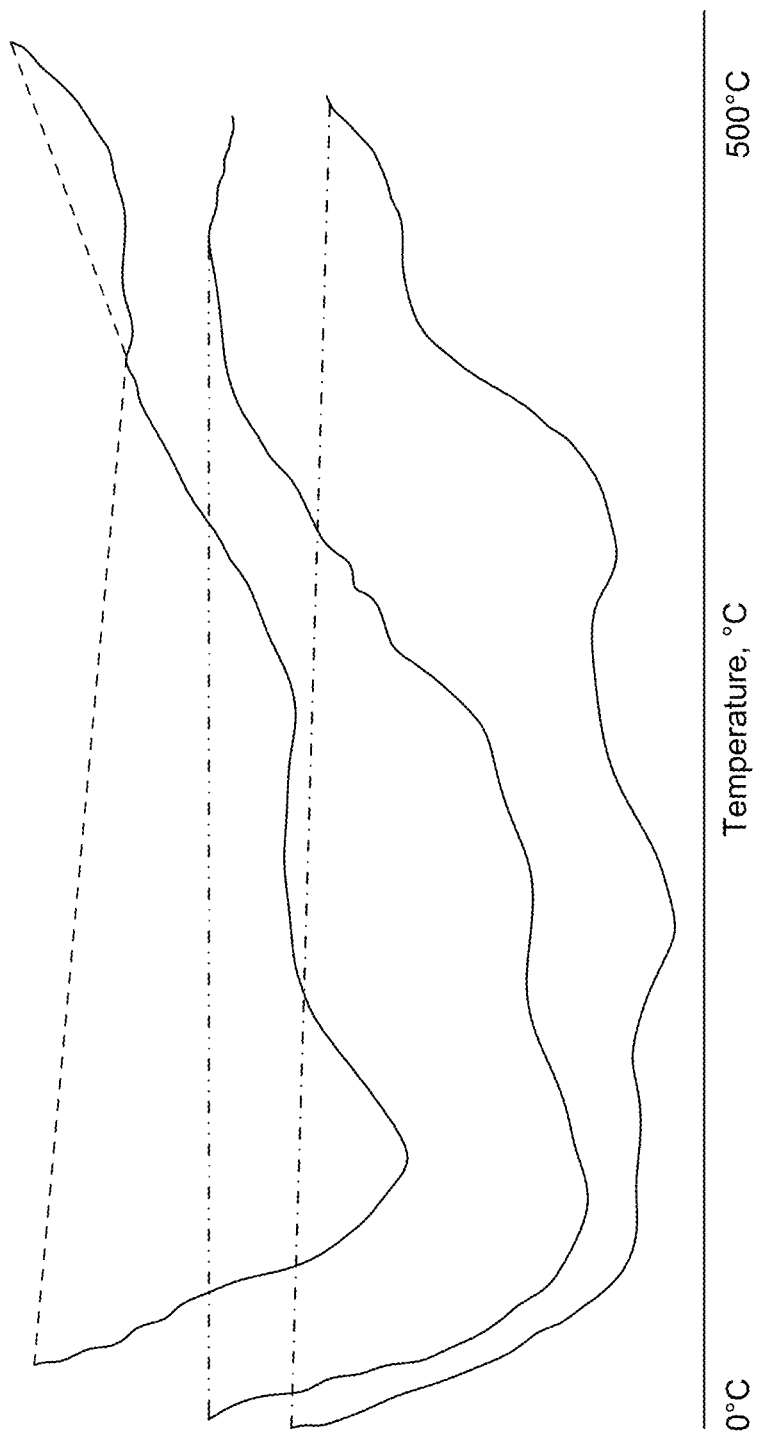
FIG. 13 illustrates differential thermal analysis (DTA) thermograms of the three bioplastic sheets, according to one embodiment of the present disclosure.

The TGA measures the mass change of a material as a function of temperature and time, in a controlled atmosphere. It is ideally used to assess volatile content, thermal stability, degradation characteristics, aging/lifetime breakdown, sintering behavior and reaction kinetics. The mass losses of the bioplastic membranous samples were focused on four temperature regions, namely 25°–200° C., 200°–300° C., 300°–400° C., and 400°–500° C. (Table 4). Comparing the mass losses between temperature regions revealed that thermal degradation of the samples occurred at the higher temperatures (300-500° C.) were higher than those for the lower temperatures (25-300° C.). Comparing the mass losses within the temperature regions showed that PVA lost more weight (37.18% and 32.4%) than that for the GA (18.9% and 16.4%) at the higher temperature zones (300°–400° C. and 400°–500° C., respectively). In addition, the mass loss occurred up to 100° C. may be attributed to high solvation capacity with water molecule showing evaporation of loose surface bound moisture termed as free water. Furthermore, upon heating up to 150° C., the mass loss can be attributed to the evaporation of hygroscopic water. (FIG. 13)

TABLE 4

Mean[1,2,3,4] values of mass loss (%) of the three bioplastic sheets blended from GA and PVA upon thermal exposure up to 500° C.

| Formula No. | GA/ PVA | Mass loss (%) | | | |
|---|---|---|---|---|---|
| | | 25°-200° C. | 200°-300° C. | 300°-400° C. | 400°-500° C. |
| 1 | 1:00 | $15.7_a^B$ | $13.1_a^C$ | $18.9_c^A$ | $16.4_b^{AB}$ |
| 5 | 1:01 | $10.6_c^C$ | $12.7_a^C$ | $37.2_a^A$ | $24.1_b^B$ |
| 6 | 0:01 | $16.6_a^B$ | $8.7_b^C$ | $37.18_{aA}$ | $32.4_a^A$ |

[1]Means with the same letter are not differed significantly at 5% Level.
[2]Each value is an average of 3 samples.
[3] Based on original oven-dry weight.
[4]Subscripted small letters for comparisons within the same temperature zone.
[5]Superscripted capital letters for comparisons between temperature zones.

The DTA measures the temperature difference of the sample versus a reference, caused by thermal treatments in a material providing similar information to differential scanning calorimetry (DSC). The DTA usually complements TGA with phase transition information. It is well known that upon thermal reactions, there are two types of thermograms may be differentiated for a certain material, namely endotherm that consumes energy and/or exotherm that excludes energy. The formation of exotherm may be attributed to depolymerization of the bioplastic materials themselves as a result of heat treatment. Furthermore, the endotherm may be attributed to evaporation of free moisture (up to 100° C.) and hygroscopic moisture (up to 120° C.) as well as fusion or melting process of crystallites.

FIG. 13 shows the graphical representation of DTA results of the three bioplastic sheets along with tabular representation in Table 5. Comparing the thermograms of pure GA and PVA sheets (GA/PVA=0/1 and 1/0, respectively) revealed that the GA thermogram was differentiated into two distinct regions (endotherm and exotherm), while the PVA thermogram had a unique thermal state termed as endotherm. In addition, the bioplastic thermograms of GA/PVA of 1/1 had a unique endotherm. For more details, the temperature range of each thermogram and the maximum temperature of the three bioplastic blends are presented in Table 4. In addition, the absolute values of the heat change (HC) values for the endotherms ranged from 1017.3 µVs/mg to 2268.8 µVs/mg and were higher than those for the exotherms (16 µVs/mg-52.4 µVs/mg). In addition, the endotherm of the pure PVA absorbed the highest energy (2119.7 µVs/mg) among the other bioplastic blends, while the GA had the lowest value of the heat change (−1017.3 µVs/mg). Accordingly, the PVA is more thermally stable than the GA due to its higher absorption of the heat released that prevents the bioplastic sample from probable thermal degradation caused by increasing temperature. In addition, the thermal stability of the bioplastic sheets was increased with the increasing in the PVA allocation in the blend solutions.

TABLE 5

Differential thermal analysis (DTA) output for temperature range (TR), maximum temperature (MT) and heat change (HG) of the six bioplastic sheets blended from GA and PVA with different ratios upon thermal exposure up to 500° C.

| Formula No | GA/ PVA | Thermogram type | TR ° C. | MT ° C. | HG µVs/mg |
|---|---|---|---|---|---|
| 1 | 1:00 | Endotherm | 30.9-320.7 | 106.1 | −1017.3 |
| | | Exotherm | 320.7-433.4 | 406.9 | 52.4 |
| 5 | 1:01 | Endotherm | 40.9-383.6 | 123 | −1467.1 |
| 6 | 0:01 | Endotherm | 44.9-438.2 | 220.2 | −2119.7 |

Figure 14A:
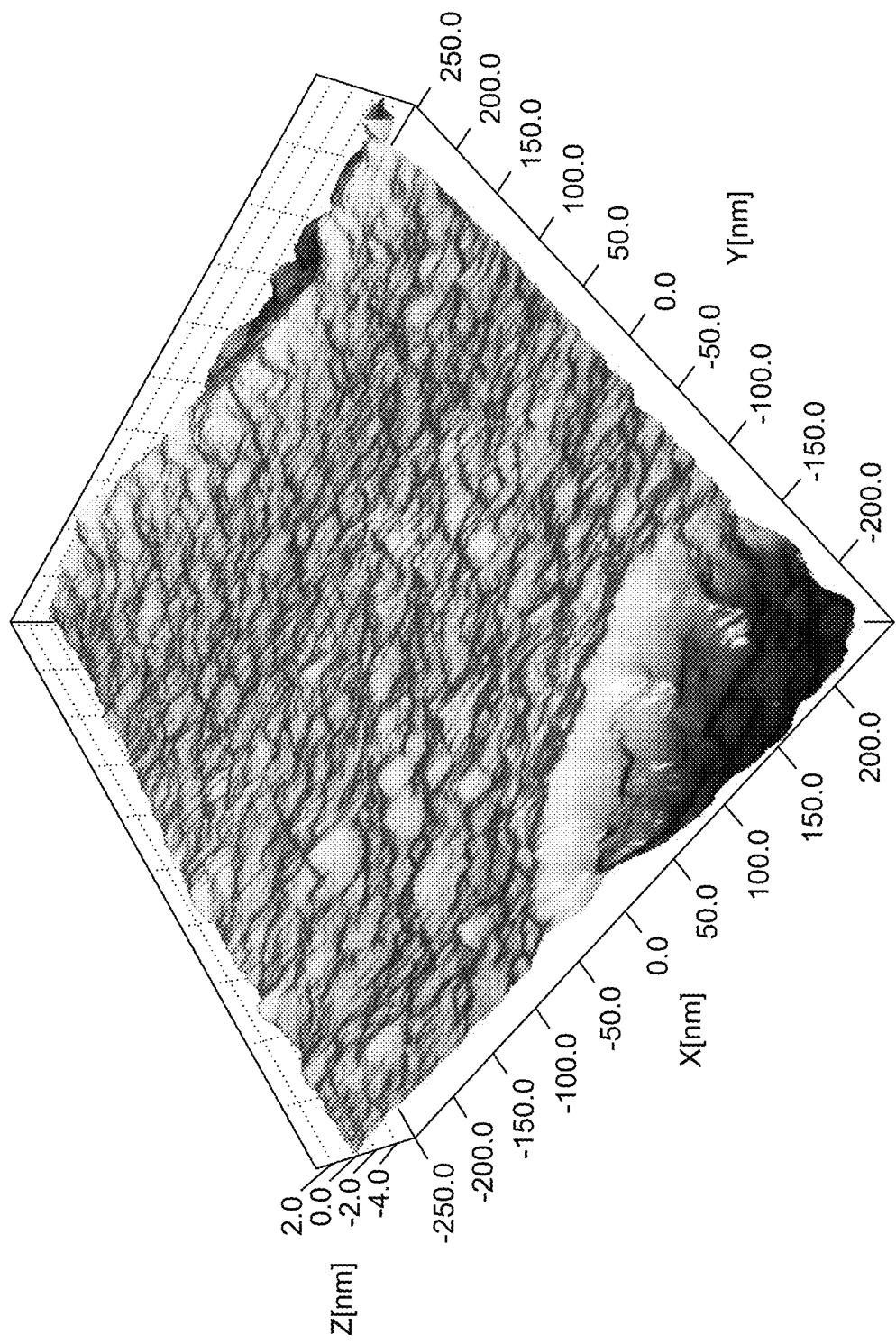
FIG. 14A-14C illustrate atomic force microscopy (AFM) image showing surface roughness of the three bioplastic sheets, according to one embodiment of the present disclosure.
Figure 14B:
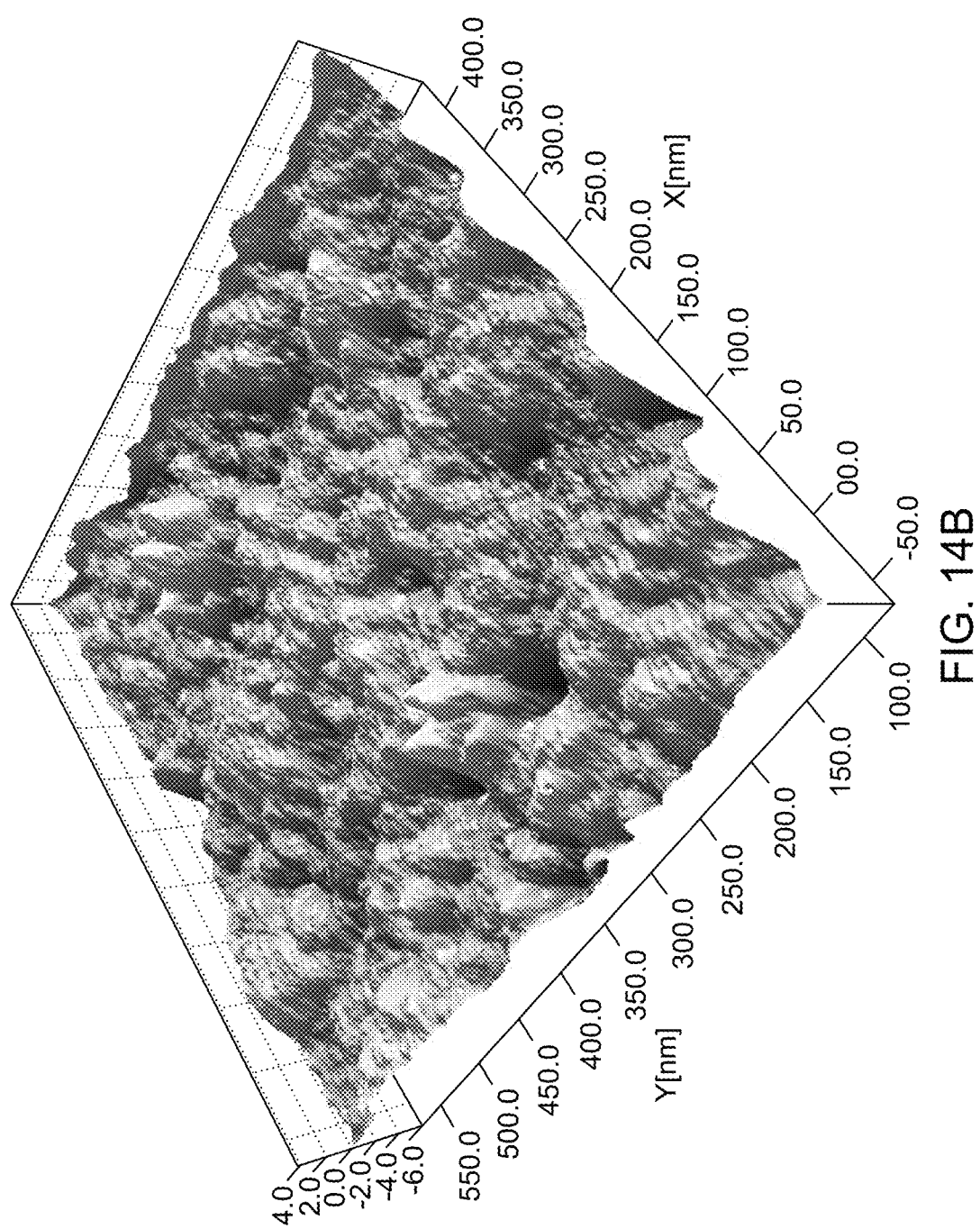
Figure 14C:
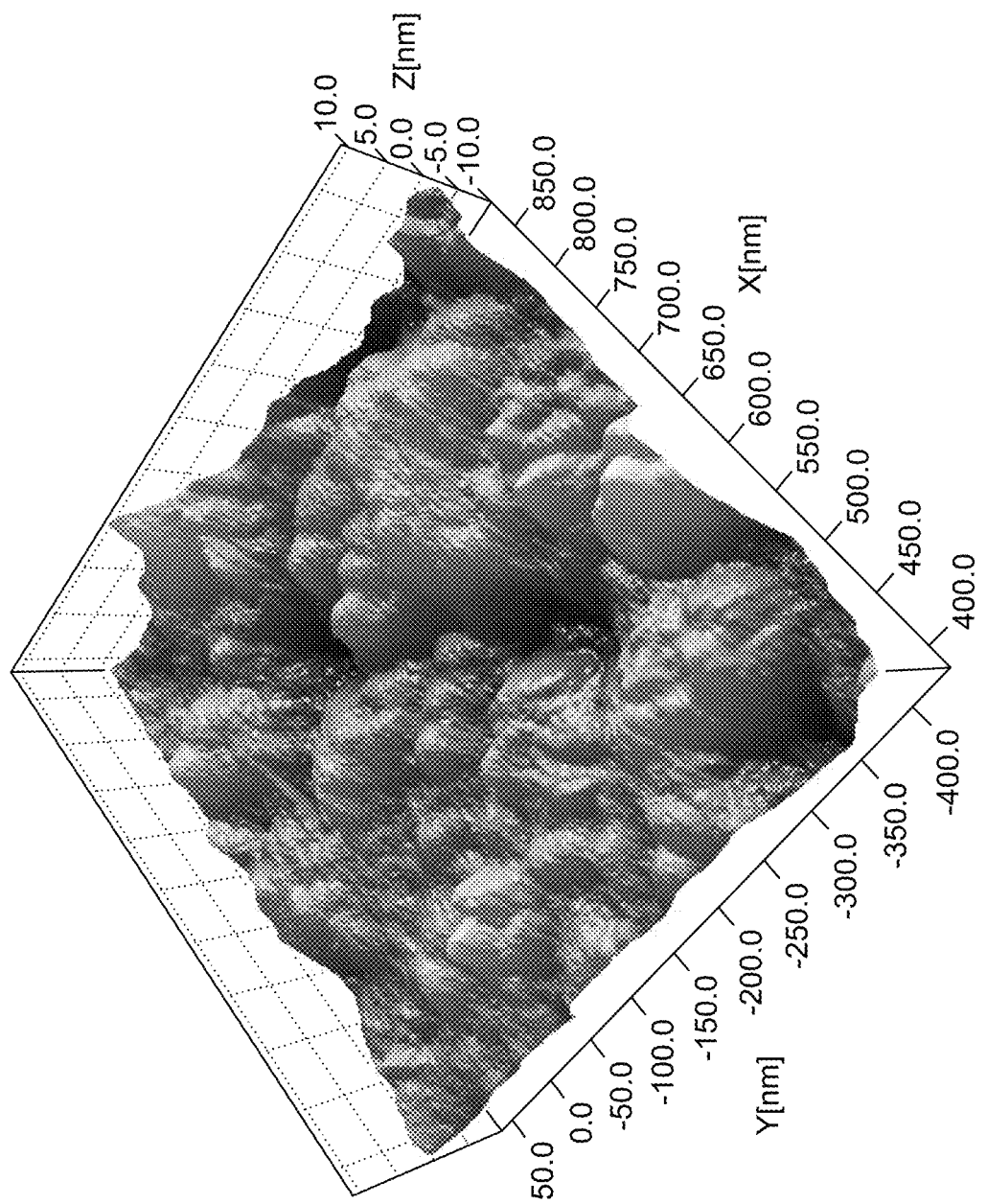

For the nanometric particle size (NPS) of the six bioplastic sheets presented at Table 6, the GA membrane (GA/PVA=1:0) had the lowest NPS for each of mean (13.7 nm) and maximum values (55.4 nm). On the other hand, the PVA sheets had the highest NPS values (22.98 and 89.75 nm for mean and maximum values, respectively). In between, increasing the PVA concentration in the bioplastic blends increased the NPS gradually. FIGS. 14A-14C confirms the surface roughness features investigated by atomic force microscope (AFM).

TABLE 6

Some statistic parameters, namely maximum value (Max.), mean, observations number (ON) and standard deviation (SD) of particle size and pore diameter of the bioplastic sheets blended from GA and PVA.

| No. | AG/PVA ratio | Statistic parameters | Nanometric particle size (NPS) (nm) | Pore diameter (nm) |
|---|---|---|---|---|
| 1 | 1:00 | Max. | 55.4 | 67.62 |
| | | Mean | 13.7 | 12.61 |
| | | SD | 7.7 | 8.58 |
| | | ON | 1293 | 1111 |
| 5 | 1:01 | Max. | 76.75 | 133.89 |
| | | Mean | 18.76 | 18.76 |
| | | SD | 12 | 14.11 |
| | | ON | 634 | 580 |
| 6 | 0:01 | Max. | 89.75 | 117.97 |
| | | Mean | 22.98 | 19.57 |
| | | SD | 14.54 | 14.84 |
| | | ON | 564 | 530 |

FIGS. 15-17 show the microbial communities for the initial soil samples the buried bioplastic sheets were found to be different in number and species. The species of bacteria and fungi were differed according to the type of buried membrane. For the buried PVA, the dominant species were *Pseudomonas* spp., *Bacillus* spp, *Aspergillus* spp and *Penicillium* spp. In addition, for the buried GA, the major species were *Bacillus* spp, *Pseudomonas* spp, *Aspergillus* spp, *Rhizorpous* spp, *Fusarium* spp, *Penicillium* spp, and yeast Saccharomyces. In addition, the microbial communities of the bioplastic blend, namely (GA/PVA=1:1) contained *Bacillus* spp, *Pseudomonas* spp, *Aspergillus* spp, *Rhizorpous* spp, *Fusarium* spp and *Penicillium* spp. Furthermore, the fungal species detected were more than bacteria and it was found that the fungal isolates had high capability of utilizing his sheets as growth substrates than bacteria.

The data of the colony forming units (CFU) of microbial species are presented in Table 7. The total numbers of bacteria and fungi including yeast in the initial soil sample were found to be $2.28 \times 10^5$ and $1.1 \times 10^2$ CFU/ml, respectively and were greater than those for GA and PVA (Table 6). The CFU of GA alone (GA/PVA=1/0) was lower than that for pure PVA (GA/PVA=0/1) after 30 and 60 days. There were no clear differences in the CFU values obtained after 30 and 60 days for all the six bioplastic sheets.

TABLE 7

Colony forming units (CFU) of microbial populations for bacterial and fungal species in the six buried bioplastic sheets blended from GA and PVA with the different GA/PVA ratios of 1/0, 1/1 and 0/1 as compared with the control soil sample (GA/PVA = 0/0).

| AG/ratio PVA | CFU/ml | |
|---|---|---|
| | After 30 days | After 60 days |
| 1/0 | $1.89 \times 10^5$ and $1.67 \times 10^2$ | $1.90 \times 10^5$ and $1.83 \times 10^2$ |
| 1/1 | $1.88 \times 10^5$ and $1.87 \times 10^2$ | $1.84 \times 10^5$ and $1.76 \times 10^2$ |
| 0/1 | $2.12 \times 10^5$ and $1.13 \times 10^2$ | $2.23 \times 10^5$ and $1.16 \times 10^2$ |
| 0/0 | $2.28 \times 10^5$ and $1.1 \times 10^2$ | Not applicable |

To conclude, the production of transparent bioplastic sheets through the method of the present disclosure (static vibrated-horizontal flow (SVHF) producing the bioplastic sheets free of air bubbles. The use of electrostatically-charged hydrophobic surface, such as the acrylic [poly (methyl acrylate)] panel, sevres as an ideal template surface, as a result of which peeling the bioplastic sheets of the acrylic panel can be done more easily. Also, the use of nano-dehydration was very efficient, thereby saving substantial amount of time and costs. The characterizations performed for the principle bioplastic sheet blended from GA and PVA in the ratio of 1:1 indicated that addition of the polyvinyl alcohol enhanced all the properties studied for the bioplastic sheet prepared from blend solutions are as follows: FTIR peaks of the three-bioplastic arisen were arisen at 3416 $cm^{-1}$ for O—H stretching vibrations, 2939 $cm^{-1}$ for C—H stretching modes, 1641 $cm^{-1}$ for the carbonyl stretching modes together with bulk ring mode at 1426 $cm^{-1}$ and 1047 $cm^{-1}$ and 1047 $cm^{-1}$ for C—O—C anti-symmetric stretching. The similarities between the three FT-IR spectra in their principal peaks are due to their common functional groups. The absolute values of the heat change values for the endotherms ranged from 1017.3 μVs/mg to 2268.8 μVs/mg and were higher than those for the exotherms (16 μVs/mg-52.4 μVs/mg). The broad pattern of the GA diffractogram obtained confirmed the amorphous nature of the GA, while the relatively sharpness of the polyvinyl alcohol confirmed its semi-crystallinity. The crystallinity index values were increased with the increasing in the PVA allocation in the blend.

Thermal degradation of the samples occurred at the higher temperatures (300-500° C.) were higher than those for the lower temperatures (25-300° C.). Polyvinyl alcohol lost more weight than that for the GA at the high temperature zones. The PVA lost more weight than that for the GA at higher temperatures. The thermal stability of the bioplastic sheets was increased as the PVA allocation in the blend was increased. The GA sheets had the lowest nanometric particle size, while those for the polyvinyl alcohol had the highest ones. Increasing the polyvinyl alcohol concentration in the bioplastic blends increased the NPS gradually.

The microbial communities in all the buried bioplastic sheets including the control one was different in number and species. The species of bacteria and fungi differed according to the type of buried sheet. The microbiological survey revealed that all the three bioplastic sheets degraded contrarily to petroleum-based sheets.

Addition of PVA to GA enhanced the sheets formation and their properties such as crystallinity index and thermal stability. Forcing a mild aeration stream was directed to the surface of the mixture GA/PVA precursors after pouring and spreading it on a suitable un-sticky template surface in order to exclude the major air-bubbles.

INDUSTRIAL APPLICABILITY

The present disclosure provides an apparatus and a method of manufacturing a bioplastic material from a blend solution of GA and PVA. The bioplastic sheets produced with the apparatus of the present disclosure were free of any air-bubbles, and were of of high quality with uniform thickness. The use of electrostatically-charged hydrophobic surface, such as the acrylic [poly (methyl acrylate)] panel, sevres as an ideal template surface, as a result of which peeling the bioplastic sheets of the acrylic panel can be done more easily. Also, the use of nano-dehydration was very efficient, thereby saving substantial amount of time and costs.

It is understood that the examples, embodiments, and teachings presented in this application are described merely for illustrative purposes. Any variations or modifications thereof are to be included within the scope of the present application as discussed.

ACKNOWLEDGMENT

The authors extend their appreciation to the Deputyship for Research & Innovation, Ministry of Education in Saudi Arabia for funding this research work through the project number "2021-054" and King Abdulaziz University, DSR, Jeddah, Saudi Arabia.

The invention claimed is:
1. A system for manufacturing a bioplastic material, the system comprising:
   a cold air supply unit;
   a vacuum pump; and
   an apparatus fluidly coupled to the cold air supply unit and the vacuum pump, the apparatus comprising:
      a panel having a first end, a second end, an inlet configured to fluidly couple with the cold air supply unit, an outlet configured to fluidly couple with the vacuum pump, and a plurality of walls extending from the first end, the second end, the panel configured to accommodate a blend solution of gum arabic and polyvinyl alcohol;
      a plurality of support members coupled to the first end and the second end of the panel and configured to adjust a slope angle of the panel, wherein the slope angle is defined between a plane of the panel defined by the first end and the second end thereof and a horizontal plane;

one or more vibration generating units coupled to the plurality of support members and configured to vibrate the panel when the blend solution flows from the first end to the second end of the panel; and a filter having a dehydrant stored therein, the filter configured to fluidly couple with the inlet to supply the dehydrant.

2. The system of claim 1, wherein the dehydrant is at least one selected from the group consisting of $P_4O_{10}$, calcium chloride, silica gel, and any combinations thereof.

3. The system of claim 1, wherein the dehydrant is $P_4O_{10}$.

* * * * *